US008363902B2

(12) United States Patent
Nobori et al.

(10) Patent No.: US 8,363,902 B2
(45) Date of Patent: Jan. 29, 2013

(54) MOVING OBJECT DETECTION METHOD AND MOVING OBJECT DETECTION APPARATUS

(75) Inventors: Kunio Nobori, Osaka (JP); Masahiro Iwasaki, Kyoto (JP); Mikiya Nakata, Nara (JP)

(73) Assignee: Panasonic Corporation, Osaka (JP)

( * ) Notice: Subject to any disclaimer, the term of this patent is extended or adjusted under 35 U.S.C. 154(b) by 194 days.

(21) Appl. No.: 12/980,903

(22) Filed: Dec. 29, 2010

(65) Prior Publication Data

US 2011/0091074 A1    Apr. 21, 2011

Related U.S. Application Data

(63) Continuation of application No. PCT/JP2010/003323, filed on May 18, 2010.

(30) Foreign Application Priority Data

Jul. 29, 2009    (JP) .................................. 2009-176088

(51) Int. Cl.
  *G06K 9/00*    (2006.01)
(52) U.S. Cl. ........ 382/107; 382/103; 382/173; 382/181; 382/203; 382/224; 348/143; 348/156
(58) Field of Classification Search ........................ None
See application file for complete search history.

(56) References Cited

U.S. PATENT DOCUMENTS

| 5,734,737 | A  | * | 3/1998  | Chang et al. ................... 382/107 |
| 6,643,387 | B1 | * | 11/2003 | Sethuraman et al. .......... 382/107 |
| 6,804,398 | B2 | * | 10/2004 | Kaneko et al. ................. 382/190 |
| 6,859,554 | B2 | * | 2/2005  | Porikli et al. .................. 382/173 |
| 7,003,156 | B1 | * | 2/2006  | Yamamoto et al. ........... 382/181 |
| 7,035,431 | B2 |   | 4/2006  | Blake et al. |
| 2003/0123704 | A1 | * | 7/2003 | Farmer et al. ................. 382/103 |
| 2006/0045349 | A1 | * | 3/2006 | Yamamoto et al. ........... 382/190 |
| 2008/0187174 | A1 |   | 8/2008 | Metaxas et al. |
| 2008/0279478 | A1 |   | 11/2008 | Tsoupko-Sitnikov et al. |
| 2010/0202661 | A1 |   | 8/2010 | Mizutani |

FOREIGN PATENT DOCUMENTS

| JP | 3-73075    | 3/1991  |
| JP | 7-129777   | 5/1995  |
| JP | 8-214289   | 8/1996  |
| JP | 11-66319   | 3/1999  |
| JP | 2006-31114 | 2/2006  |
| JP | 2008-282376 | 11/2008 |

(Continued)

OTHER PUBLICATIONS

Bai et al., "A Geodesic Framework for Fast Interactive Image and Video Segmentation and Matting", Oct. 14-21, 2007, IEEE ICCV 2007, 1-8.*

(Continued)

*Primary Examiner* — Matthew Bella
*Assistant Examiner* — Jason Heidemann
(74) *Attorney, Agent, or Firm* — Wenderoth, Lind & Ponack, LLP

(57) ABSTRACT

A moving object detection method includes: extracting NL long-term trajectories (NL≧2) over TL pictures (TL≧3) and NS short-term trajectories (NS>NL) over TS pictures (TL>TS≧2), using movement trajectories; calculating a geodetic distance between the NL long-term trajectories and a geodetic distance between the NS short-term trajectories (S205); calculating an approximate geodetic distance that is a geodetic distance between the NS movement trajectories over the TL pictures, based on the calculated geodetic distance between the long-term trajectories and geodetic distance between the short-term trajectories (S206); and performing segmentation based on the calculated approximate geodetic distance (S207).

17 Claims, 18 Drawing Sheets

FOREIGN PATENT DOCUMENTS

WO   2009/078056   6/2009

OTHER PUBLICATIONS

Bai et al. "Geodesic Matting: A Framework for Fast Interactive Image and Video Segmentation and Matting", 2008. International Journal on Computer Vision.*

Min et al. "Extraction and Temporal Segmentation of Multiple Motion Trajectories in Human Motion", 2004, CVPRW'04, 1-9.*

Yuan et al. "Detecting Motion Regions in the Presence of a Strong Parallax from a Moving Camera by Multiview Geometric Constraints", Sep. 2007, IEEE Transactions on Pattern Analysis and Machine Intelligence, vol. 29, No. 9, 1627-1641.*

P. Anandan, "*A Computational Framework and an Algorithm for the Measurement of Visual Motion*", International Journal of Computer Vision, vol. 2, pp. 283-310, 1989.

Vladimir Kolmogorov, et al., "*Computing Visual Correspondence with Occlusions via Graph Cuts*", International Conference on Computer Vision, 2001.

E.W. Dijkstra, "*A Note on Two Problems in Connexion with Graphs*", Numerische Mathematik, pp. 269-271, 1959.

J.B. Tenenbaum et al. "*A Global Geometric Framework for Nonlinear Dimensionality Reduction*", Science vol. 290, Dec. 22, 2000.

\* cited by examiner

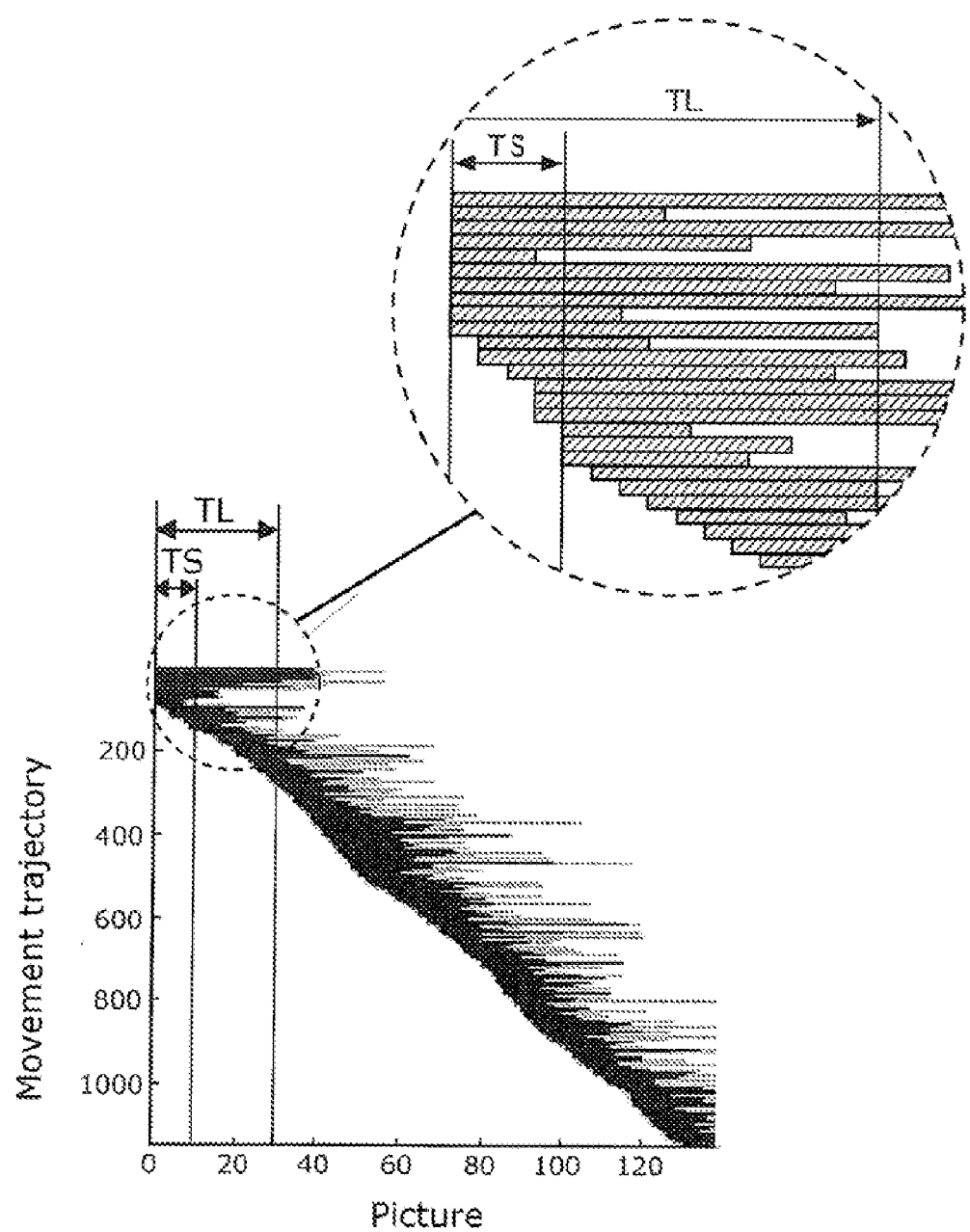

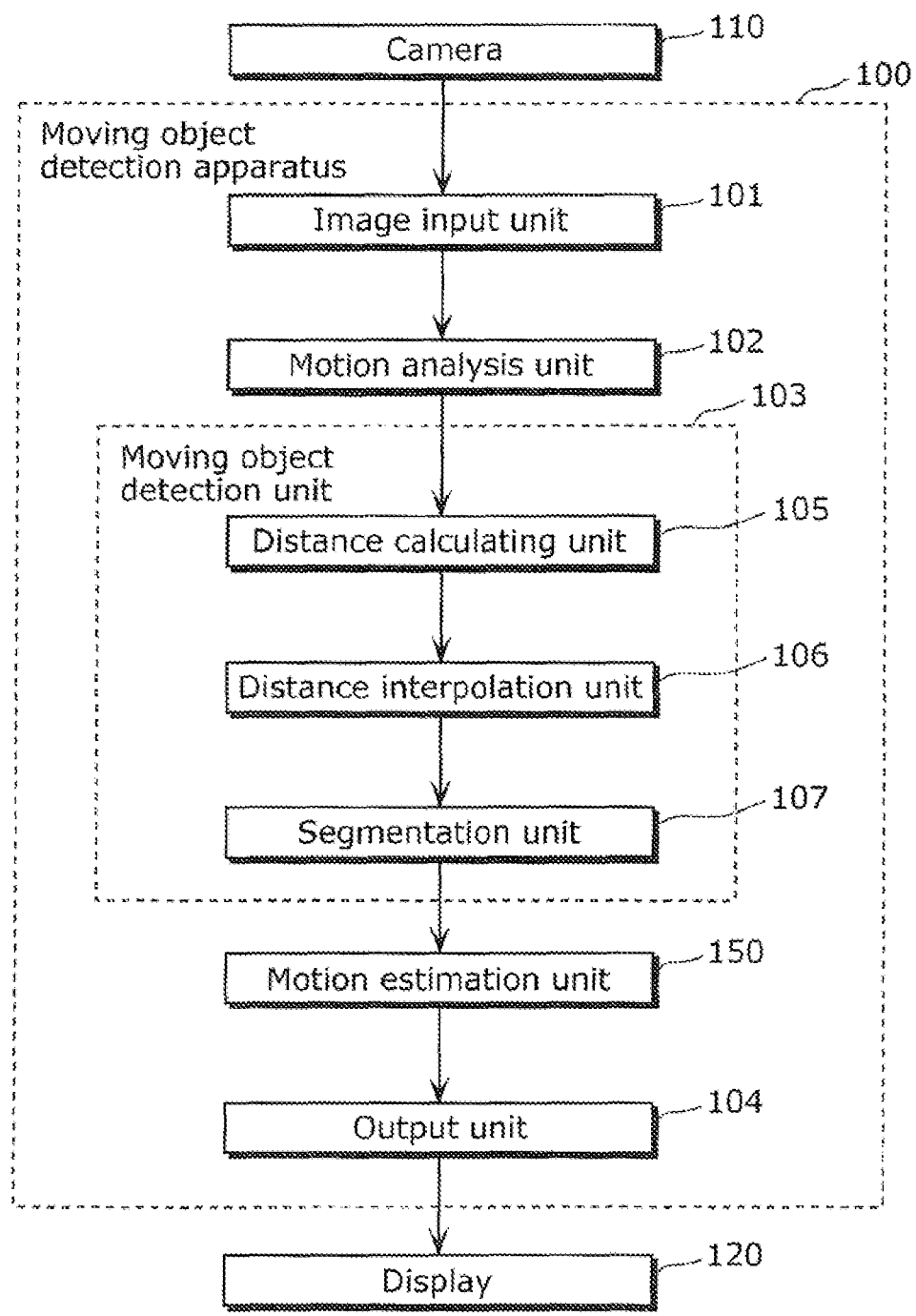

Representative trajectory $\overline{x^2}$ corresponding to $\theta_2$

Representative trajectory $\overline{x^1}$ corresponding to $\theta_1$

MOVING OBJECT DETECTION METHOD AND MOVING OBJECT DETECTION APPARATUS

CROSS REFERENCE TO RELATED APPLICATION(S)

This is a continuation application of PCT application No. PCT/JP2010/003323 filed on May 18, 2010, designating the United States of America.

BACKGROUND OF THE INVENTION (1) Field of the Invention

The present invention relates to an image processing technique of detecting a moving object by segmenting the moving object in video, and in particular, relates to an apparatus that detects a moving object based on motion information in video even when the moving object such as a person moves changing its shape.

(2) Description of the Related Art

Research and development on a region extraction technique with which a moving object is detected by extracting a region of the moving object in an image from the image including an image of the moving object (hereinafter referred simply to as "moving object") has been widely carried out. The technique of extracting a region of a moving object is, particularly when the moving object is a person, a fundamental technique used in common far: focus control and image quality improvement processing for digital video cameras or digital still cameras; safe driving support system for vehicles; or a collision-avoidance control or a collision-avoidance alarm for a robot with people.

The technique of extracting a region of a moving object in an image includes the following two general methods: (1) a method of identifying a region of the moving object by evaluating the similarity between a moving object model prepared in advance and a candidate region in the image; and (2) a method of identifying a region of the moving object by segmenting the image into plural sub regions to calculate an amount of characteristics and integrating similar regions on the basis of the amount of characteristics.

The former method includes, as a representative method, a method of extracting a candidate of a moving object region from an image, and then evaluates the similarity between the candidate of the moving object region that has been extracted and a moving object model prepared in advance to extract a region with high similarity as the moving object region. There further is a method that utilizes a moving object model in consideration of change in shape when extracting a region of a moving object that moves changing its shape such as a walking person.

According to a method described in Patent Literature 1 (Japanese Unexamined Patent Application Publication No. 8-214289), for example, a silhouette image of a moving object is extracted from plural images, as a candidate of a moving object region. Then, the similarity between a model related to a change in shape of the moving object that has been parameterized in advance and the silhouette image that has been extracted is evaluated, so that a parameter of a region with high similarity and the model are estimated. This makes it possible to apply the parameterized model also to the person that moves periodically changing shape, thereby allowing extraction of a region of the moving object.

The latter method includes, as a representative method, a method, of segmenting once an image into plural sub regions, extracting an amount of characteristics based on a brightness value of an pixel in each of the sub regions, and then evaluating the similarity of the amounts of characteristics between the plural sub regions, to integrate the regions with high similarities as the same moving object region.

According to the method described in Patent Literature 2 (Japanese Unexamined Patent Application Publication No. 2006-031114), for example, an image is segmented once into rectangular sub regions, the amount of characteristics is calculated based on the brightness or motion of the sub regions, and the sub regions are integrated based on an order of the similarities of the amount of characteristics, thereby allowing extraction of the region of a moving object.

In the conventional techniques of region extraction described above, however, there is a problem that a moving object cannot be accurately extracted in the case where the moving object is partially occluded by another moving object in such a scene in which plural moving objects such as people come and go in the street, for example, or in the case where a moving object that is significantly different in size is included.

With the conventional method of extracting a region using a model prepared in advance as represented by the method described in Patent Literature 1, it is necessary to extract a candidate of a moving object region from an image. In this case, the model obtained by parameterizing the moving object cannot be accurately applied to the candidate of the moving object region unless the candidate of the moving object region is appropriately extracted. In the scene described above, in particular, since the shape or size of the moving object changes significantly, it is difficult to appropriately extract the candidate of a moving object region.

Furthermore, even when the candidate of the moving object region is appropriately extracted, there still remains a problem as described below. Particularly in the case where the moving object is an articulated object such as a person, since the range of changes in an image due to a variety of postures or a size of the moving object is significantly large, a huge number of parameters are required when performing parameterization on the moving object model. This induces an error in applying a model. Thus, there is a problem that the moving object cannot be detected accurately because, for example, plural moving objects are erroneously regarded as one moving object in extracting a region, or a region in which a moving object to be extracted does not exist is erroneously extracted as a moving object.

With the conventional method of extracting a region using the amount of characteristics between sub regions as represented by the method described in Patent Literature 2, two sub regions having the brightness values or motions which are used as the amount of characteristics and which are not similar to each other are separated as different regions. Thus, there is a problem that the moving object cannot be detected accurately because, when the brightness value of a moving object differs depending on a position and the motion differs depending on the position, as in a person, two sub regions in the same moving object are extracted as regions belonging to moving objects different from each other.

Therefore, the present invention has been conceived in view of solving the aforementioned conventional problems, and it is an object thereof to provide a moving object detection method and so on capable of extracting a region of a moving object with a high accuracy without being affected by a change in shape or size or occlusion of the moving object in video.

SUMMARY OF THE INVENTION

An embodiment according to the present invention is a moving object detection method for detecting a moving object in video by performing segmentation on all or part of the moving object in the video, the moving object detection method comprising: extracting NL long-term trajectories (NL≧2) and NS short-term trajectories (NS>NL) using movement trajectories each of which includes corresponding points over two or more pictures included in the video, the long-term trajectories being movement trajectories over TL pictures (TL≧3), the short-term trajectories being movement trajectories over TS pictures (TL>TS≧2) included in the TL pictures; calculating a geodetic distance between the NL long-term trajectories and a geodetic distance between the NS short-term trajectories; calculating an approximate geodetic distance that is a geodetic distance between NS movement trajectories over the TL pictures, based on the geodetic distance between the long-term trajectories and the geodetic distance between the short-term trajectories calculated in the calculating of a geodetic distance; and performing segmentation by segmenting a group of the movement trajectories as a single region, based on the approximate geodetic distance calculated in the calculating of an approximate geodetic distance.

With the above configuration, since segmentation is performed based on information on a difference in a motion of movement trajectories which is included in an approximate geodetic distance between long-term trajectories, it is possible to extract the region with a high accuracy without being affected by a change in shape. More specifically, since segmentation can be performed based on an approximate geodetic distance calculated using a geodetic distance between long-term trajectories and a geodetic distance between short-term trajectories, it is possible to extract the region of a moving object with a high accuracy without being affected by a change in shape or size or occlusion of the moving object in video.

Here, as a method of calculating an approximate geodetic distance, in the calculating of an approximate geodetic distance, a partial short-term trajectory may be extracted based on the geodetic distance between the short-term trajectories, and the approximate geodetic distance may be calculated based on the extracted partial short-term trajectory, the partial short-term trajectory being a group of the short-term trajectories.

With the above configuration, since an approximate geodetic distance can be calculated based only on similar short-term trajectories even when short-term trajectories of plural moving objects having different motions are included in plural short-term trajectories, it is possible to extract the region of a moving object with a high accuracy.

Here, as another method of calculating an approximate geodetic distance, in the calculating of an approximate geodetic distance, the approximate geodetic distance may be calculated by performing linear interpolation on the geodetic distance between the long-term trajectories based on the geodetic distance between the short-term trajectories.

With the above configuration, an approximate geodetic distance can be calculated while maintaining a relationship of a geodetic distance between short-term trajectories, and it is possible to more accurately perform region extraction of a moving object based on the approximate geodetic distance.

Here, as yet another method of calculating an approximate geodetic distance, in the calculating of an approximate geodetic distance, the approximate geodetic distance may be calculated by performing weighted linear interpolation so that a weight becomes larger as the geodetic distance between the short-term trajectories is smaller.

With the above configuration, an approximate geodetic distance can be calculated while maintaining a local relationship of a geodetic distance between short-term trajectories, and it is possible to more accurately perform region extraction of a moving object, by performing segmentation based on the approximate geodetic distance.

In addition, a preferable embodiment according to the present invention includes performing image processing on the video captured in the capturing pictures so that the video is displayed in a different mode for each of the regions segmented in the performing segmentation, and outputting the video after the image processing.

With the above configuration, image processing is performed in a different display mode for each of the specified regions, and thus it is possible to easily identify the detected moving object.

In addition, a preferable embodiment according to the present invention includes, in the performing image processing, NS approximate long-term trajectories are calculated, based on the approximate geodetic distance calculated in the calculating of an approximate geodetic distance and the NL long-term trajectories and the NS short-term trajectories extracted in the extracting, and video including the calculated approximate long-term trajectories is output, the NS approximate long-term trajectories being interpolated with a virtual long-term trajectory.

With the above configuration, since an image including long-term trajectories that cannot be calculated from a video can be displayed, it is possible to easily identify detected movement trajectories of a moving object.

An embodiment according to the present invention further comprises estimating motion of the moving object by: calculating a representative movement trajectory that represents the region, using movement trajectories included in the region segmented in the performing segmentation; and estimating that the region moves according to the calculated representative movement trajectory.

With the above configuration, it is possible to estimate a motion with a higher accuracy by estimating a motion of a moving object using a representative trajectory of plural movement trajectories.

In addition, when extracting the long-term trajectories, the long-term trajectories may be extracted by changing the TL according to the number of extracted long-term trajectories.

With the above configuration, since the number of pictures of long-term trajectories can be changed according to characteristics of a moving object included in plural pictures, it is possible to extract the larger number of long-term trajectories over the larger number of pictures. Thus, since the long-term trajectories including larger amount of information can be used, it is possible to perform segmentation with a higher accuracy.

In addition, when extracting the long-term trajectories, the long-term trajectories may be extracted by increasing the TL when the number of extracted long-term trajectories exceeds a predetermined first upper limit.

With the above configuration, it is possible to extract an appropriate number of long-term trajectories over the larger number of pictures.

In addition, when extracting the long-term trajectories, the long-term trajectories may be extracted by decreasing the TL when the number of extracted long-term trajectories falls below a predetermined first lower limit.

With the above configuration, it is possible to secure as many as pictures, while retaining the long-term trajectories not to fall below the predetermined number of movement trajectories.

In addition, when extracting the short-term trajectories, the short-term trajectories may be extracted by changing the TS according to the number of extracted short-term trajectories.

With the above configuration, since the number of pictures of short-term trajectories can be changed according to characteristics of a moving object included in plural pictures, it is possible to extract the larger number of short-term trajectories over the larger number of pictures. Thus, since the short-term trajectories including larger amount of information can be used, it is possible to perform segmentation with a higher accuracy.

In addition, when extracting the short-term trajectories, the short-term trajectories may be extracted by increasing the TS when the number of extracted short-term trajectories exceeds a predetermined second upper limit.

With the above configuration, it is possible to extract an appropriate number of short-term trajectories over the larger number of pictures.

In addition, when extracting the short-term trajectories, the short-term trajectories may be extracted by decreasing the TS when the number of extracted short-term trajectories falls below a predetermined second lower limit.

With the above configuration, it is possible to secure as many as pictures, while retaining the short-term trajectories not to fall below the predetermined number of movement trajectories.

It is to be noted that the moving object detection method according to the present invention can be realized not only as a program on a computer but also as a moving object detection apparatus in which each of the steps described above is configured as hardware, a program causing a computer to execute each of the steps described above, a computer readable recoding medium on which the program is stored, such as a CD-ROM, an image processing apparatus that extracts or segments a region of an object having motion in video, and the like.

With the method and apparatus described above, since segmentation can be performed using an approximate geodetic distance calculated based on a geodetic distance between long-term trajectories and a geodetic distance between short-term trajectories, it is possible to extract the region of a moving object with a high accuracy without being affected by a change in shape or size or occlusion of the moving object in video.

FURTHER INFORMATION ABOUT TECHNICAL BACKGROUND TO THIS APPLICATION

The disclosure of Japanese Patent Application No. 2009-176088 filed on Jul. 29, 2009 including specification, drawings and claims is incorporated herein by reference in its entirety.

The disclosure of PCT application No. PCT/JP2010/003323 filed on May 18, 2010 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 7 is a diagram which shows an example of a relationship between movement trajectories and the number of pictures.

FIG. 15A is a diagram which shows a configuration of a moving object detection apparatus according to a modification example of the embodiment of the present invention.

DESCRIPTION OF THE PREFERRED EMBODIMENT(S)

The following is a description of an embodiment according to the present invention, with reference to the drawings.

Figure 1:
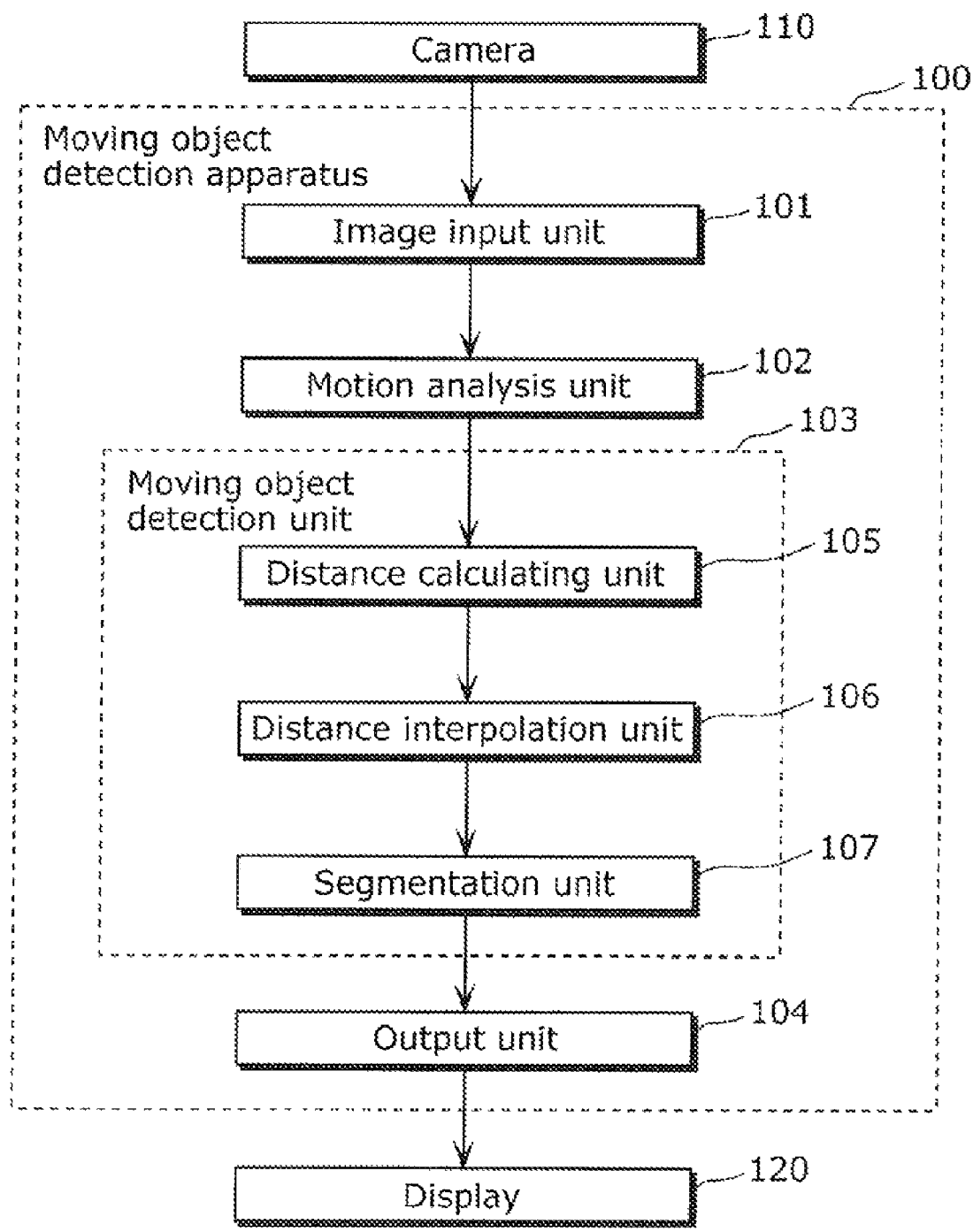
FIG. 1 is a diagram which shows a configuration of a moving object detection apparatus according to an embodiment of the present invention.

FIG. 1 is a diagram which shows a configuration of a moving object detection apparatus 100 according to the embodiment. As shown in FIG. 1, the moving object detection apparatus 100 includes: an image input unit 101; a motion analysis unit 102; a moving object detection unit 103; and an output unit 104. Furthermore, the moving object detection unit 103 includes: a distance calculating unit 105; a distance interpolation unit 106; and a segmentation unit 107. The moving object detection apparatus 100 is an apparatus that detects a moving object in video by segmenting all or part of region of the moving object in the video including plural pictures. According to the present embodiment, the moving object detection apparatus 100 obtains a video captured by a camera 110, detects a moving object in the obtained video, and generates and outputs an image based on a result of the detection. The display 120 displays the image provided from the moving object detection apparatus 100.

The image input unit 101 is a processing unit that captures plural pictures included in the video, and is, for example, a camera, a communication interface connected to a camera, or the like.

The motion analysis unit 102 is a processing unit that calculates movement trajectories which include corresponding points over two or more pictures included in the pictures captured by the image input unit 101. More specifically, the motion analysis unit 102 calculates and outputs movement trajectories which include corresponding points over two or more pictures, for pictures captured by the image input unit 101, by detecting corresponding points between two consecutive pictures. Here, the motion analysis unit 102 detects corresponding points for each pixel in a picture, or detects a representative corresponding point for adjoining pixels (a block) in the picture.

It is to be noted that the term "corresponding point" refers to a position in a picture and is considered to indicate the same image element in plural pictures. Thus, movement trajectories indicate motion of the image element over two ore more consecutive pictures.

In the present embodiment, a corresponding point is not discriminated between a corresponding point detected for a single pixel and a corresponding point detected for plural pixels. In addition, each of a movement trajectory indicated by corresponding points, in one picture, which corresponds to a pixel i of another picture and a movement trajectory indicated by corresponding points, in one picture, which corresponds to a block i of another picture is called a movement trajectory of the pixel i.

The moving object detection unit 103 is a processing unit that identifies a group of similar movement trajectories as one region based on the movement trajectories, thereby performing clustering on the movement trajectories. The moving object detection unit 103 includes: a distance calculating unit 105; a distance interpolation unit 106; and a segmentation unit 107.

The distance calculating unit 105 is a processing unit that obtains plural movement trajectories that include corresponding points over plural pictures included in video, and calculates a distance indicating a similarity between the obtained movement trajectories.

In the present embodiment, the distance calculating unit 105 extracts an NL number of long-term trajectories over a TL number pictures (TL≧3) and an NS number of short-term trajectories over a TS number of pictures (TL>TS≧2), using the plural movement trajectories calculated by the motion analysis unit 102. It is assumed that the TS pictures are included in the TL pictures, at this time. In addition, it is assumed that the corresponding points over the TS pictures, which are included in the NL long-term trajectories, are also included in the NS short-term trajectories.

Furthermore, the distance calculating unit 105 calculates and outputs a distance indicating a similarity between two movement trajectories, for each of the extracted NL long-term trajectories and NS short-term trajectories.

In the present embodiment, the term "distance" includes not only the distance between two points in a two-dimensional image space but also an arithmetic distance between multidimensional data items, as described below. It is to be noted that a distance and a similarity generally have a contradictory relationship. More specifically, the similarity is high when the distance between two data items is small, and the similarity is low when distance between two data items is large.

The distance interpolation unit 106 is a processing unit that calculates and outputs an approximate distance that is a distance between the NS movement trajectories based on the distance between the NL long-term trajectories, using the distance between the NL long-term trajectories and the distance between NS short-term trajectories which are calculated by the distance calculating unit 105.

The segmentation unit 107 is a processing unit that performs segmentation by identifying a group of similar movement trajectories as one region, based on the approximate distance calculated by the distance calculating unit 106.

The output unit 104 outputs the result of detection of the moving object in the video in the moving object detection unit 103 or the result of segmentation of the image performed. More specifically, the output unit 104 performs image processing on, and outputs to a display device or the like, the video captured by the image input unit 101 so as to be displayed, for example, in a different mode per region identified by the moving object detection unit 103.

In the present embodiment, the term "segmentation" includes both of a detection technique for extracting an image region in which a particular object exists and a segmentation technique for segmenting a region in an image regardless of what the object is. It is to be noted that, since the detection technique and the segmentation technique have a lot in common, they are not discriminated in the present embodiment.

Further in the present embodiment, the term "moving object detection" includes both of a detection technique for identifying only an image region in which an object that moves with respect to a base coordinate system and a segmentation technique for segmenting a region in an image for each object that has a relatively different movement.

Figure 2:
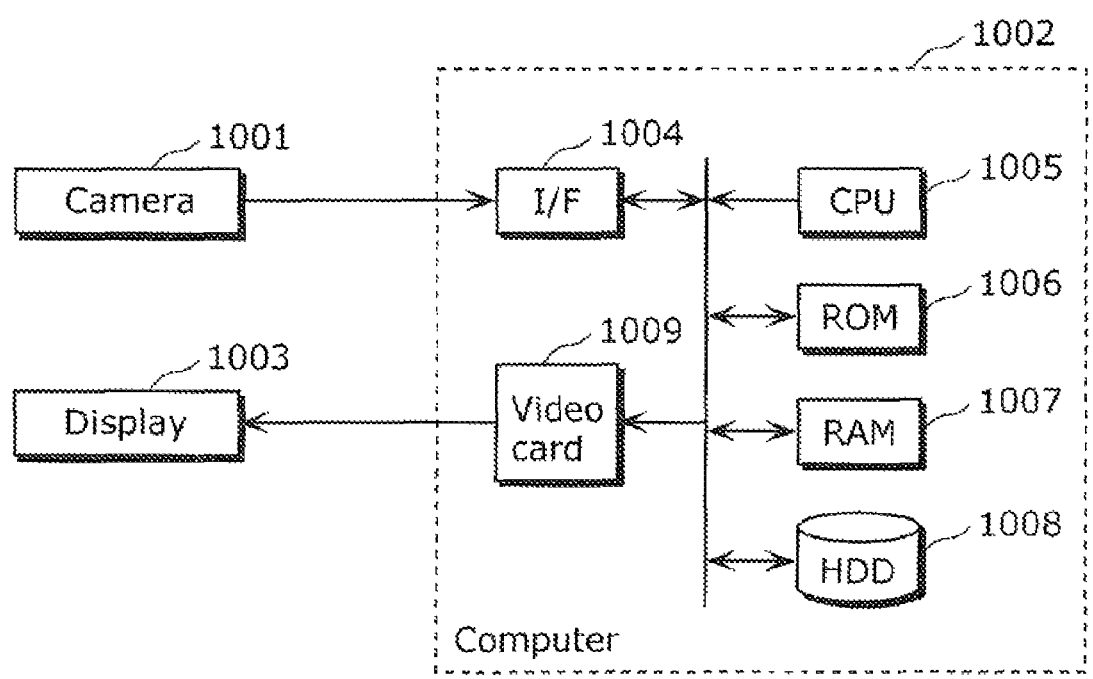
FIG. 2 is a diagram which shows a hardware configuration of the moving object detection apparatus configured by a computer.

It is to be noted that each of the components included in the moving object detection apparatus 100 (the image input unit 101, the motion analysis unit 102, the moving object detection unit 103, and the output unit 104) may be implemented as software such as a program executed on a computer, or may be implemented as hardware such as an electronic circuit. FIG. 2 is a diagram which shows a hardware configuration of the moving object detection apparatus implemented as software according to the present embodiment.

A camera 1001 captures a video and outputs the captured video to a computer 1002. The computer 1002 obtains the video provided from the camera 1001 and performs segmentation processing. Then the computer 1002 generates an image for indicating a result of the segmentation processing. The display 1003 obtains and displays the image generated by the computer 1002.

The computer 1002 includes: an interface (I/F) 1004; a central processing unit (CPU) 1005; a read only memory (ROM) 1006; a random access memory (RAM) 1007; a hard disk drive (HDD) 1008; and a video card 1009. The program that causes the computer 1002 to operate is held by the ROM 1006 or the HDD 1008 in advance. The program is read by the CPU 1005 that is a processor, from the ROM 1006 or the HDD 1008 to the RAM 1007, to be developed. The CPU 1005 executes each instruction that is coded in the program developed by the RAM 1007. The I/F 1004, in response to the execution of the program, downloads the image captured by the camera 1001, onto the RAM 1007. The video card 1009 outputs the image generated in response to the execution of the program, to be displayed on the display 1003.

It is to be noted that the computer program is not limited to being stored in the ROM 1006 or the HDD 1008 each of which is a semiconductor, but may be stored in an optical disk, for example. Furthermore, the computer program may be transmitted via a wired or wireless network, broadcasting, and so on, and downloaded onto the RAM 1007 of the computer.

Figure 3:
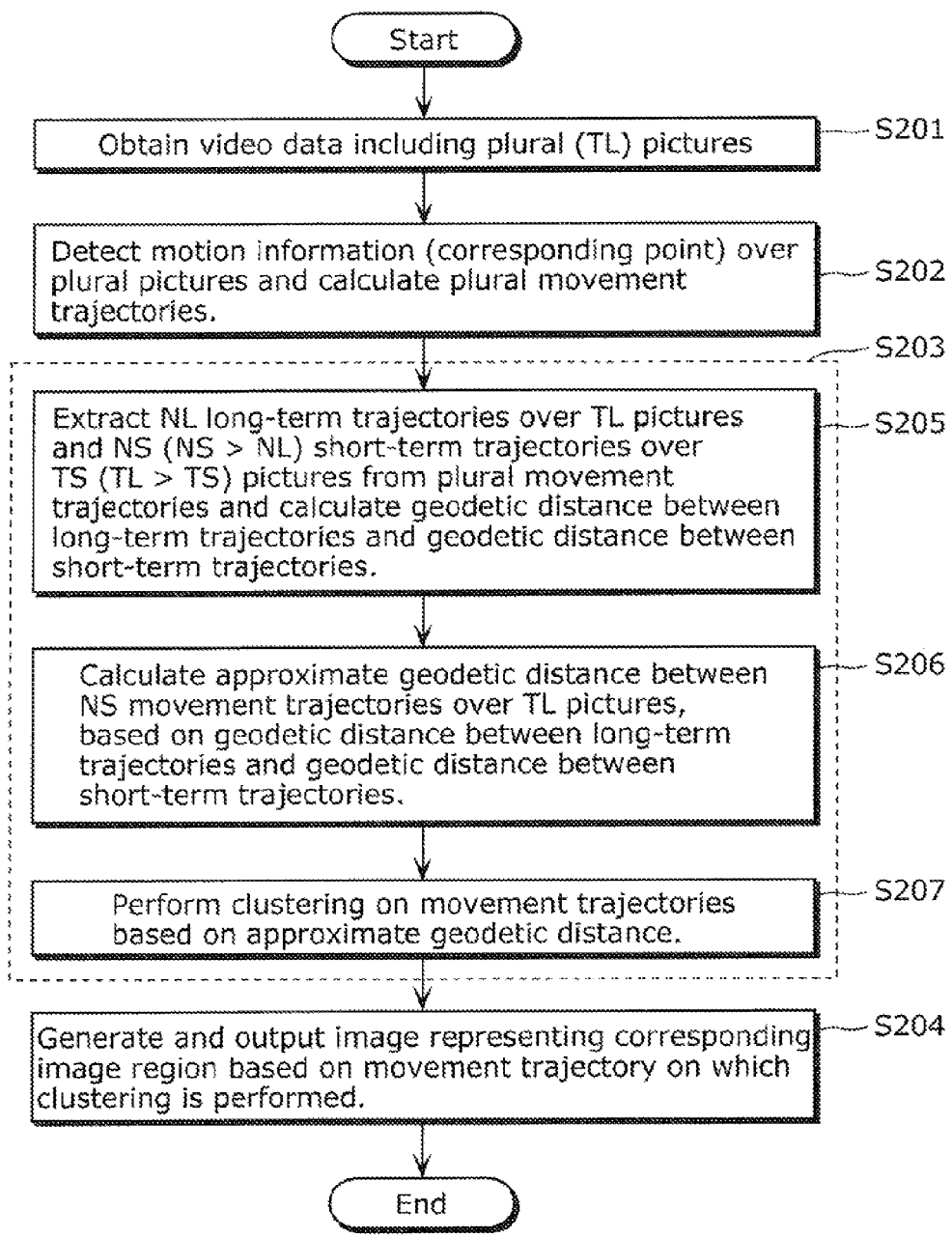
FIG. 3 is a flowchart which shows an operation procedure of the moving object detection apparatus.

The following describes an operation of the moving object detection apparatus 100 according to the present embodiment, with reference to FIG. 3.

FIG. 3 is a flowchart that shows an operation of the moving object detection apparatus 100 according to the present embodiment.

In FIG. 3, seven steps S201 to S207 respectively correspond to the processing units 101 to 107 in FIG. 1. More specifically, the image input unit 101 performs the processing of an image inputting step S201, the motion analysis unit 102 performs the processing of a motion analysis step S202, the moving object detection unit 103 performs the processing of a moving object detection step S203, and the output unit 104 performs the processing of an image outputting step S204. Furthermore, the moving object detection step S203 includes three sub-steps of a distance calculating step S205, a distance interpolation step S206, and a segmentation step S207. The distance calculating unit 105 performs the processing of the distance calculating step S205, the distance interpolation unit 106 performs the processing of the distance interpolation step S206, and the segmentation unit 107 performs the processing of the segmentation step S207.

First, the image input unit 101 obtains plural pictures included in video, from the camera 1001 (step S201). Next, the motion analysis unit 102 calculates movement trajectories over consecutive two or more pictures included in the plural pictures obtained by the image input unit 101 (step S202). Then, the distance calculating unit 105 extracts NL long-term trajectories over TL pictures and NS short-term trajectories over TS pictures, based on the plural movement trajectories calculated by the motion analysis unit 102. Further, the distance calculating unit 105 calculates a geodetic distance between the extracted long-term trajectories and a geodetic distance between the extracted short-term trajectories (step S205). Next, the distance interpolation unit 106 calculates an approximate geodetic distance between the NS movement trajectories over the TL pictures, based on the geodetic distance between the long-term trajectories and the geodetic distance between the short-term trajectories calculated by the distance calculating unit 105 (step S206). Next, the segmentation unit 107 detects a group of similar movement trajectories as one region, based on the approximate geodetic distance calculated by the distance interpolation unit 106, thereby performing segmentation (step S207). Lastly, the output unit 104 generates an image based on a region segmented by the segmentation unit 107 and displays the generated image on the display 1003 (step S204).

The following describes in detail each of the steps shown in FIG. 3.

First, the image inputting step S201 performed by the image input unit 101 is described in detail. The image input unit 101 obtains plural pictures included in video, from the camera 1001. According to the present embodiment, it is assumed that the video obtained by the camera 1001 is a video of 30 frames per second.

Figure 4:
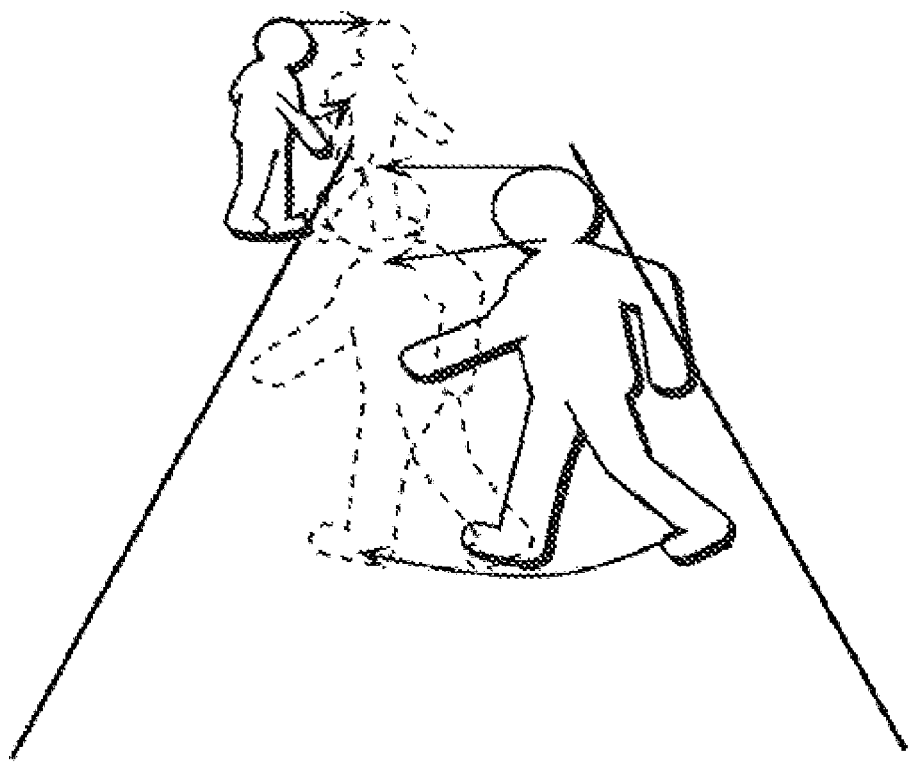
FIG. 4 is a diagram which shows an example of a picture-taking situation.
Figure 5:
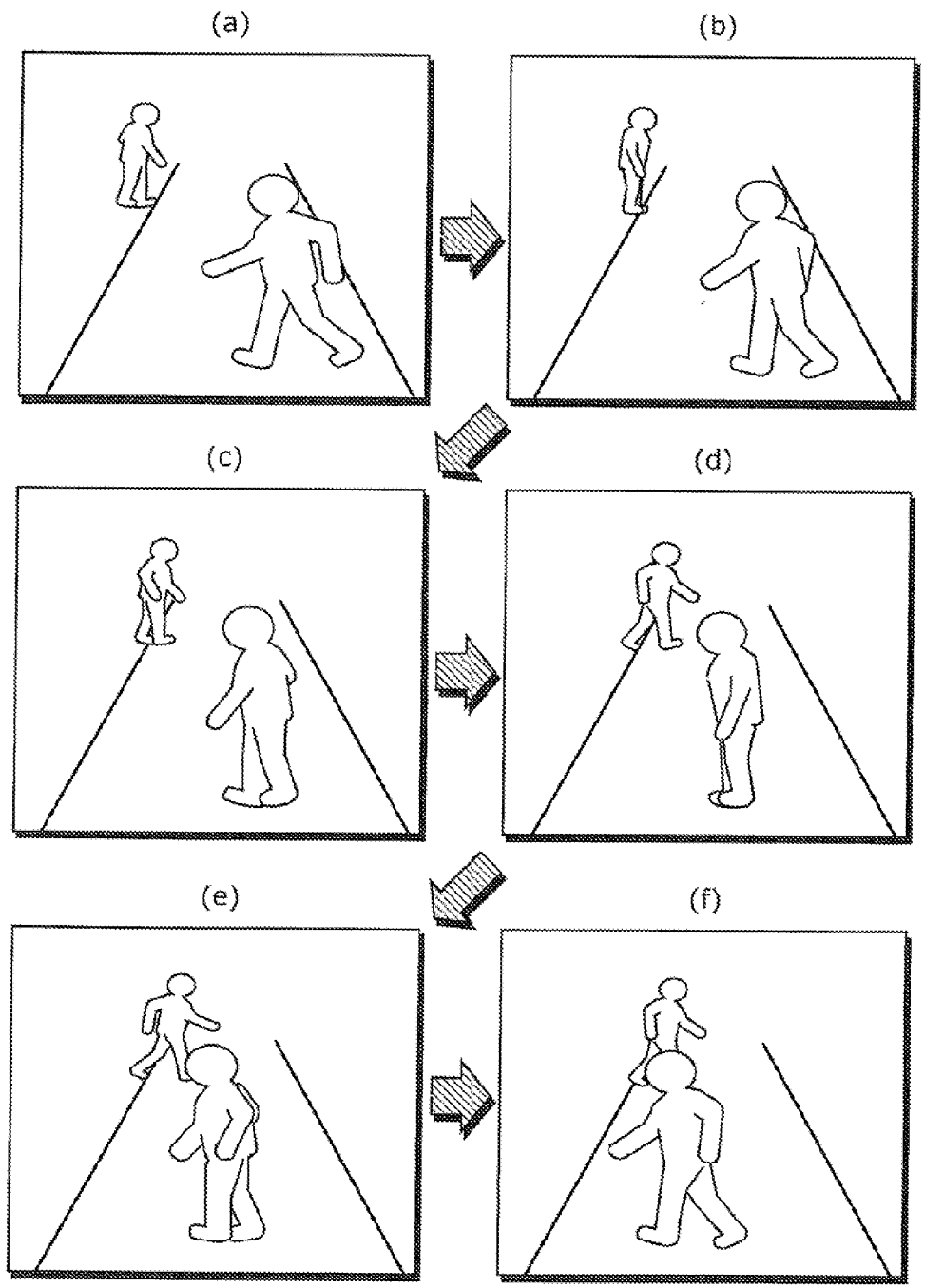
FIG. 5 is a diagram which shows an example of pictures included in video.

FIG. 4 is a diagram which shows an example of a picture-taking situation that is a situation of an object to be captured by the camera 110. Furthermore, FIG. 5 is a diagram which shows an example of pictures included in the video captured by the camera 110 in the picture-taking situation of FIG. 4. The image input unit 101 captures TL pictures (TL≧3) starting from the first frame to the TLth frame, from the camera 110. According to the present embodiment, the number of pictures TL is specified in advance and assumed to be 30 frames (TL=30).

Next, the motion analyzing step S202 performed by the motion analysis unit 102 is described in detail. The motion analysis unit 102 obtains the plural pictures from the image input unit 101 and detects corresponding points between two pictures for the obtained plural pictures, thereby calculating and outputting movement trajectories over consecutive two or more pictures.

More specifically, the motion analysis unit 102 detects, on the basis of all of the pixels (I number of pixels) in a picture of the first frame, corresponding pixels in (TL−1) pictures from the second frame to the TLth frame. Furthermore, the motion analysis unit 102 may detect corresponding points between consecutive two pictures for the TL pictures and concatenate the detected corresponding points over consecutive two or more pictures starting from the first frame, thereby detecting a pixel, in another picture, which corresponds to a pixel in a picture of the first frame. It is to be noted that a further specific technique for detecting corresponding points over plural pictures is described in detail in Non Patent Literature 1 (P. Anandan, "A Computational Framework and an Algorithm for the Measurement of Visual Motion", International Journal of Computer Vision, Vol. 2, pp. 283-310, 1989) and Non Patent Literature 2 (Vladimir Kolmogorov and Ramin Zabih, "Computing Visual Correspondence with Occlusions via Graph Cuts", International Conference on Computer Vision, 2001), and thus a detailed description here is omitted. Then the motion analysis unit 102 extracts, from the result of detecting corresponding points over the TL pictures, corresponding points detected over TS or more pictures (TL>TS≧2), thereby calculating movement trajectories. In the present embodiment, the number of pictures TS is specified in advance, assumed here as 10 frames (TS=10).

A movement trajectory $x^i$ of a pixel i is represented as in the Expression 1 below, using a coordinate value $(x_1^i, y_1^i)$ of the pixel i in a picture of the first frame and a pixel coordinate value $(x_t^i, y_t^i)$ of a corresponding point.

$$x^i = (x_1^i, y_1^i, \ldots, x_t^i, y_t^i, \ldots, x_{TL}^i, y_{TL}^i)$$ Expression 1

Here, the movement trajectory $x^i$ in Expression 1 includes, in addition to the case where a pixel coordinate of the corresponding point over all of the TL pictures from the first frame to the TLth frame, movement trajectory where a pixel coordinate of the corresponding point from the (TS+1)th frame to the TLth frame does not exist.

It is to be noted that the motion analysis unit 102 may detect corresponding points for adjoining pixels (a block) in a picture, instead of detecting corresponding points for each of the pixels in the picture.

Next, the distance calculating step S205 performed by the distance calculating unit 105 is described in detail. The distance calculating unit 105 extracts each of long-term trajectories XL over the TL pictures and short-term trajectories XS over the TS pictures based on the plural movement trajectories X calculated by the motion analysis unit 102, and calculates a distance between movement trajectories (step S205).

In the present embodiment, the long-term trajectories XL are corresponding points over consecutive TL pictures from the first frame to the TLth frame. Furthermore, the short-term trajectories XS are corresponding points over consecutive TS pictures from the first frame to the TSth frame. In addition, the following describes the case where NL long-term trajectories and NS short-term trajectories are respectively extracted from the NS movement trajectories calculated by the motion analysis unit 102.

Figure 6:
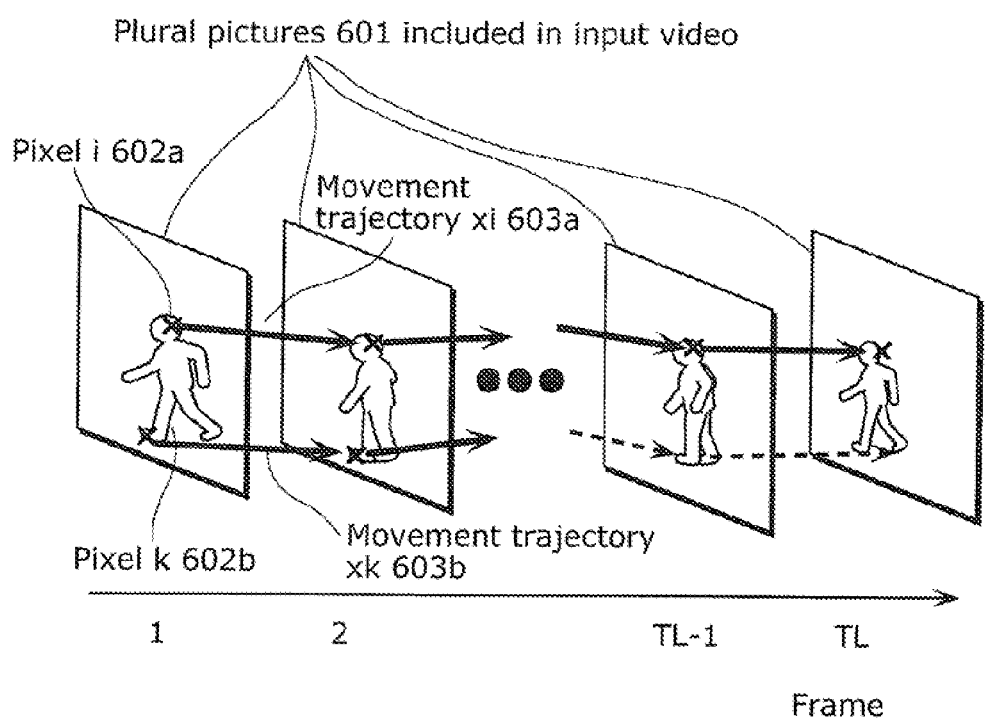
FIG. 6 is a diagram which shows an example of movement trajectories.

FIG. 6 is a diagram which shows an example of movement trajectories. The video inputted into the motion analysis unit 102 includes TL pictures 601. The movement trajectory $x^i$ 603a is a group of corresponding points on pictures from the second frame to the TLth frame, which correspond to a given pixel i602a on the first frame, and are represented by a vector which is a group of image coordinate values of each of the pictures. In addition, the movement trajectories include movement trajectories, such as the movement trajectories $x^k$ 603 of the pixel k602b in FIG. 6, whose corresponding point does not exist from the (TS+1) frame onward.

FIG. 7 is a diagram which shows an example of relationship between movement trajectories and the number of pictures. In the bar chart in FIG. 7, the horizontal axis indicates pictures and the vertical axis indicates movement trajectories. The movement trajectories are indicated as bars. In each of the bars, it is indicated that a corresponding point generated in a picture corresponding to a left end of the bar disappeared in a picture next to a picture corresponding to a right end of the bar.

As shown in FIG. 7, the number of movement trajectories detected over plural pictures decreases as the number of pictures increases. This is because the case where a corresponding point on a picture does not exist in another picture increases as the number of pictures increases, due to the appearance, disappearance, or a temporal occlusion of an object. More specifically, the case increases where a corresponding point on a leg or an arm of a person, a background occluded by a person in front, or another person in FIG. 4 to FIG. 6 does not exist in another picture. Furthermore, another reason for the fact that the number of the movement trajectories decreases as the number of pictures increases is that the case increases where the motion analysis unit 102 cannot detect a corresponding point increases due to a change in shape of an object or change in lighting. For the reasons above, the number of long-term trajectories NL is equal to or less than the number of short-term trajectories NS.

Next, the distance calculating unit 105 calculates a distance that indicates a similarity between two movement trajectories, for each of the extracted NL long-term trajectories and NS short-term trajectories.

The following describes in detail the method of calculating, in the distance calculating unit 105, a distance that indicates a similarity between movement trajectories, for each of the NL long-term trajectories and the NS short-term trajectories.

The distance calculating unit 105 calculates, using Expression 2 below, a linear distance $f_L(i, j)$ between long-term trajectories of a pixel i and long-term trajectories of a pixel j. Furthermore, the distance calculating unit 105 calculates, using Expression 3 below, a linear distance $f_S(i, j)$ between short-term trajectories of the pixel i and long-term trajectories of the pixel j.

$$f_L(i, j) = \begin{cases} \frac{1}{T_L} \sum_{t=1}^{T_L} d'_{ij} & \text{if } i, j \in X_L \\ \infty & \text{otherwise} \end{cases} \quad \text{Expression 2}$$

$$f_S(i, j) = \frac{1}{T_S} \sum_{t=1}^{T_S} d'_{ij}, \quad \text{Expression 3}$$

where $d'_{ij} = \sqrt{(x_t^i - x_t^j)^2 + (y_t^i - y_t^j)^2}$

Here, the linear distance $f_L(i, j)$ calculated by Expression 2 is defined for between all of the movement trajectories for convenience of notation, however, a finite value as a linear distance is obtained only between the NL long-term trajectories XL. When the movement trajectories of the pixel i or the movement trajectories of the pixel j does not belongs to the long-term trajectories XL, the linear distance $f_L(i, j)$ becomes ∞ (infinite).

It is to be noted that, in the present embodiment, the linear distance is calculate using Expression 2 and Expression 3, however, the expression is not limited to these expressions. An index which represents a geometric similarity, such as a position in the image coordinate between movement trajectories, a motion, an acceleration, and a rate of rotation, suffices as the linear distance in the same manner as in Expression 2 and Expression 3, and the linear distance may be calculated using Expression 4 or Expression 5 below.

$$f_L(i, j) = \begin{cases} \frac{1}{T_L} \sum_{t=1}^{T_L} d'_{ij} + w \sqrt{\frac{1}{T} \sum_{t=1}^{T_L} (d'_{ij} - \bar{d}_L)^2} & \text{if } i, j \in X_L \\ \infty & \text{otherwise} \end{cases} \quad \text{Expression 4}$$

$$f_S(i, j) = \frac{1}{T_S} \sum_{t=1}^{T_S} d'_{ij} + w \sqrt{\frac{1}{T_S} \sum_{t=1}^{T_S} (d'_{ij} - \bar{d}_S)^2}, \quad \text{Expression 5}$$

where $d'_{ij} = \sqrt{(x_t^i - x_t^j)^2 + (y_t^i - y_t^j)^2}$ $$\bar{d}_L = \frac{1}{T_L} \sum_{t=1}^{T_L} d'_{ij}, \bar{d}_S = \frac{1}{T_S} \sum_{t=1}^{T_S} d'_{ij}$$

In Expression 4 and Expression 5, w denotes a weight coefficient and is a parameter that is specified by a designer. The distances $f_L(i, j)$ and $f_S(i, j)$ between movement trajectories in the above-described Expression 4 and Expression 5 are obtained by adding, to a time average of the distance between the image coordinates in movement trajectories, a time variation component of the distance between the image coordinates. The time variation component of the distance between movement trajectories, in particular, indicates the similarity of motion of movement trajectories. With this, it is possible to detect a change in shape of not only a rigid body whose distance relation between pixels does not temporally changes, but also a change in shape of an articulated object and the like.

As shown in Expression 6 below, a group of the linear distance $f_L(i, j)$ and a group of the linear distance $f_S(i, j)$ which are calculated by Expression 2 and Expression 3 are represented as a linear distance matrix $F_L$ and a linear distance matrix $F_S$, respectively.

$$F_L = \{f_L(i,j)\}$$

$$F_S = \{f_S(i,j)\} \quad \text{Expression 6}$$

It is to be noted that, in the present embodiment, a distance calculated using Expression 2 to Expression 5 is called a linear distance so as to be discriminated from a geodetic distance g and a non-linearized distance f' described below, however, the definitional identity of the linear distance is not limited to linear operation, and nonlinear operation may be included in the definitional identity of the linear distance.

Next, the distance calculating unit 105 calculates a geodetic distances $g_L(i, j)$ and $g_S(i, j)$ between movement trajectories from the linear distances $f_L(i, j)$ and $f_S(i, j)$.

The following describes in detail the processing in which the distance calculating unit 105 calculates the geodetic distance $g_L(i, j)$ from the linear distance $f_L(i, j)$.

First, the distance calculating unit 105 calculates a non-linearized distance $f_L'(i, j)$, as shown in Expression 7 below, using a predetermined threshold $R_L$, for the calculated linear distance $f_L(i, j)$.

$$f_L'(i, j) = \begin{cases} f_L(i, j) & \text{if } f_L(i, j) < R_L \\ \infty & \text{otherwise} \end{cases} \quad \text{Expression 7}$$

Next, the distance calculating unit 105 calculates the geodetic distance $g_L(i, j)$ from the non-linearized distance $f_L'(i, j)$. Here, the geodetic distance is the shortest distance among the distances of all paths that are possible to connect given two points when the distance (length) of nodes connecting plural points are obtained. More specifically, the geodetic distance in the present embodiment is a distance that indicates a similarity between two movement trajectories, and the shortest distance among the distances of the paths that pass through, as a relay point, another movement trajectory to reach, from one movement trajectory, the other movement trajectory.

Thus, the distance calculating unit 105 calculates, in calculating the geodetic distance from the ith movement trajectory to the jth movement trajectory, as one of the geodetic distances, the shortest path among all of the paths that pass through, as a relay point, another at least one of the movement trajectories to reach the jth movement trajectory from the ith movement trajectory.

For example, when a node distance $f_L'(i, j)$ directly connecting two points of the movement trajectory i and the movement trajectory j is obtained, the path connecting two points of the movement trajectory i and the movement trajectory j also includes a path that passes through another movement trajectories s, other than the path directly connecting the two points. The distance of the path that passes through the movement trajectories s is $f_L'(i, s)+f_L'(s, j)$. There are more than one path connecting two points of the movement trajectory i and the movement trajectory j as above. The distance calculating unit 105 calculates the shortest distance among the distances of paths as the geodetic distance $g_L(i, j)$ as shown in Expression 8 below.

$$g_L(i,j)=\min(f_L'(i,j),f_L'(i,s)+f_L'(s,j),\ldots) \quad \text{Expression 8}$$

In Expression 8, min (x, y, . . . ) is a function that returns the smallest value among values such as a value x and a value y. In addition, the movement trajectory s is a relay point for reaching the movement trajectory j from the movement trajectory i. Here, the number of the movement trajectories s as the relay point is not limited to one. More specifically, the path from the movement trajectory i to the movement trajectory j includes a path that has two or more movement trajectories as relay points.

As to the details of the technique for searching the shortest path between two points in calculating the geodetic distance as described above, a detailed explanation for the processing procedure, is omitted here because Dijkstra method disclosed in Non Patent Literature 3 (E. W. Dijkstra, "A note on two problems in connection with graphs", Numerische Mathematik, pp. 269-271, 1959) is widely known, for example.

In accordance with the procedure described in Non Patent Literature 3 and the like, the distance calculating unit 105 calculates the geodetic distance $g_L(i, j)$ from the linear distance $f_L(i, j)$ between the long-term trajectories. Furthermore, the distance calculating unit 105, in accordance with a procedure similar to the above, calculates the geodetic distance $g_S(i, j)$ from the linear distance $f_S(i, j)$ between the short-term trajectories, using a predetermined threshold $R_S$. A group of the calculated geodetic distance $g_L(i, j)$ and a group of the calculated geodetic distance $g_S(i, j)$ between the movement trajectories are indicated as geodetic distance matrix $G_L$ and geodetic distance matrix $G_S$, respectively, as shown in Expression 9 below.

$$G_L=\{g_L(i,j)\}$$

$$G_S=\{g_S(i,j)\} \quad \text{Expression 9}$$

The distance calculating unit 105, through the procedure described above, calculates the geodetic distance $g_L(i, j)$ that represents the similarity between NL long-term trajectories and the geodetic distance $g_S(i, j)$ that represents the similarity between NS short-term trajectories. Then the distance calculating unit 105 outputs the calculated geodetic distances $g_L(i, j)$ and $g_S(i, j)$ as the geodetic distance matrices $G_L$ and $G_S$, respectively.

It is to be noted that, as clearly shown by the expression above and the like, the geodetic distance is calculated between movement trajectories in the same dimension, according to the present embodiment. More specifically, the distance calculating unit 105 calculates the geodetic distance between movement trajectories over the same number of pictures.

Figure 8A:
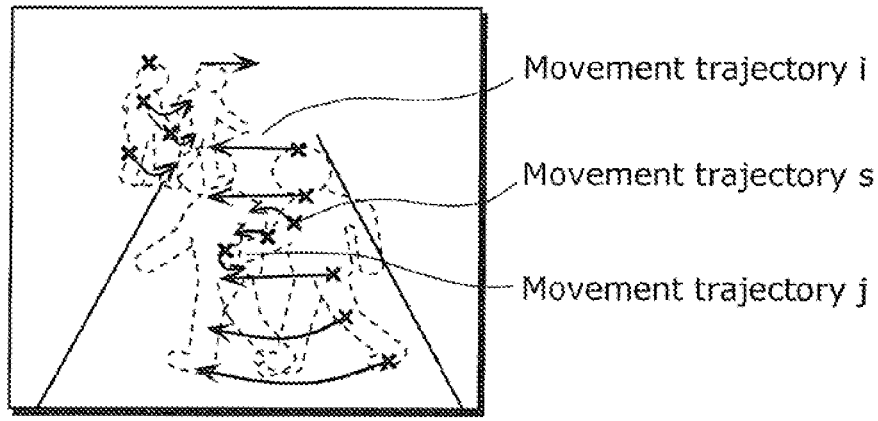
FIG. 8A is a diagram which shows an example of movement trajectories in a picture.
Figure 8B:
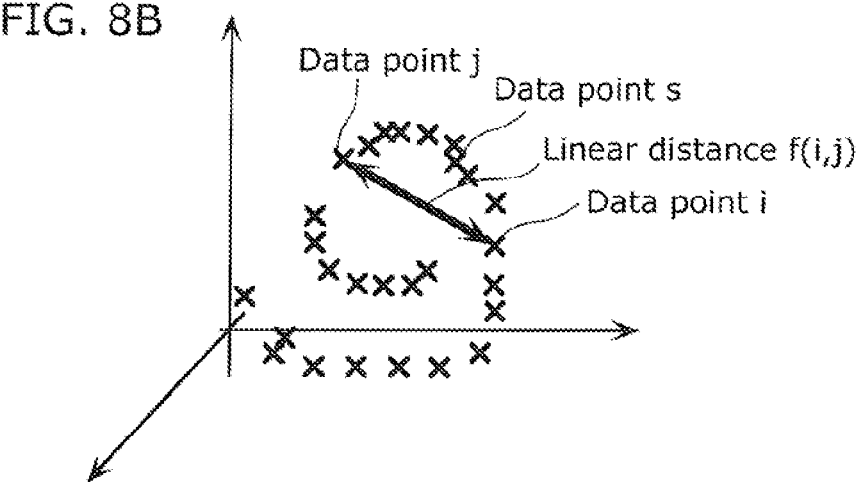
FIG. 8B is a diagram which shows a data distribution of movement trajectories.
Figure 8C:
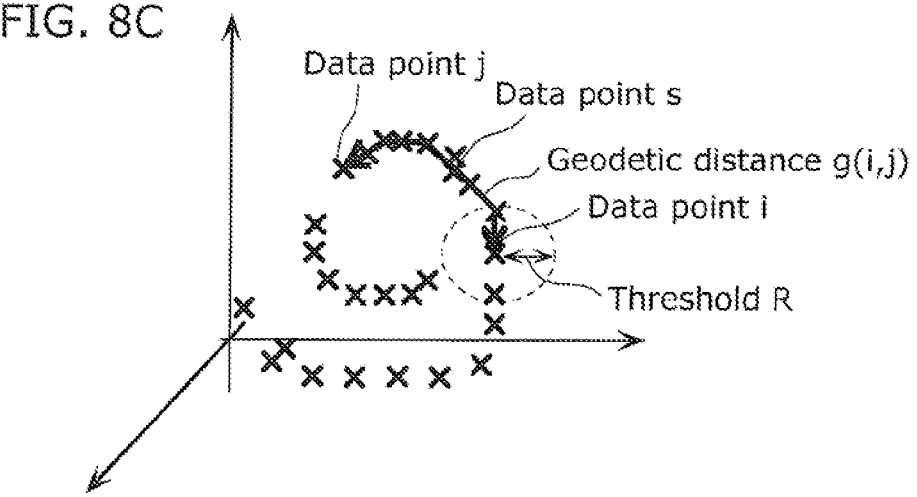
FIG. 8C is a diagram which shows a data distribution of movement trajectories.

The following describes the processing of calculating a geodetic distance from the linear distance between plural movement trajectories described above, with reference to conceptual diagrams of FIGS. 8A to 8C.

FIG. 8A is a diagram which shows an example of movement trajectories in a picture. Movement trajectories are also calculated in a background region, however, the movement trajectories of the background region are not illustrated in the following description for the purpose of simple denotation. FIGS. 8B and 8C is a diagram which shows a data distribution of movement trajectories represented by Expression 1 above.

Each of the data points indicated by "X" in FIG. 8B corresponds to the movement trajectory $x^i$ of the pixel i shown in Expression 1. It is to be noted that the movement trajectory $X^i$ is a vector including (TL×2) independent variables. Thus, the movement trajectory $x^i$ is originally data of (TL×2) dimensional space at the maximum, however, is shown as a point in a three-dimensional space for convenience of notation in FIG. 8B.

The arrow shown in FIG. 8B indicates a linear distance f(i, j) of the movement trajectory i and a movement trajectory j, which is obtained by Expression 2 and Expression 3. The linear distance between the data point i and the data point j is a distance obtained by directly connecting the data points. The arrow shown in FIG. 8C indicates a geodetic distance g(i, j) between the movement trajectory and movement trajectory j, which is obtained by Expression 7 and Expression 8. As shown in FIG. 8C, the geodetic distance between the data point i and the data point j is a distance that passes through the data point s that is a relay point as in the arrow in the diagram.

Next, the characteristics of the linear distance f(i, j) and the geodetic distance g(i, j) calculated by Expression 7 and Expression 8 are described with reference to the conceptual diagrams shown in FIGS. 9A and 9B.

Figure 9A:
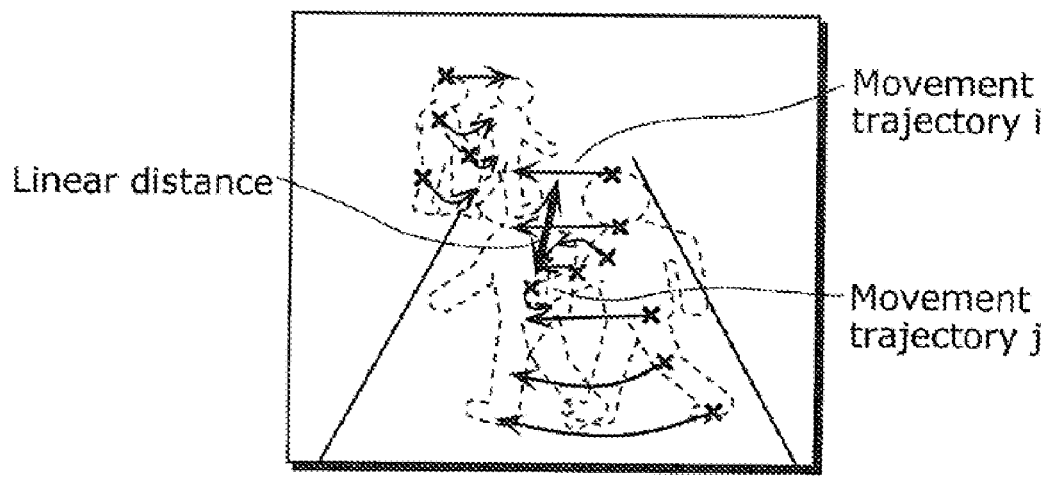
FIG. 9A is a conceptual diagram for explaining a characteristic of a geodetic distance.
Figure 9B:
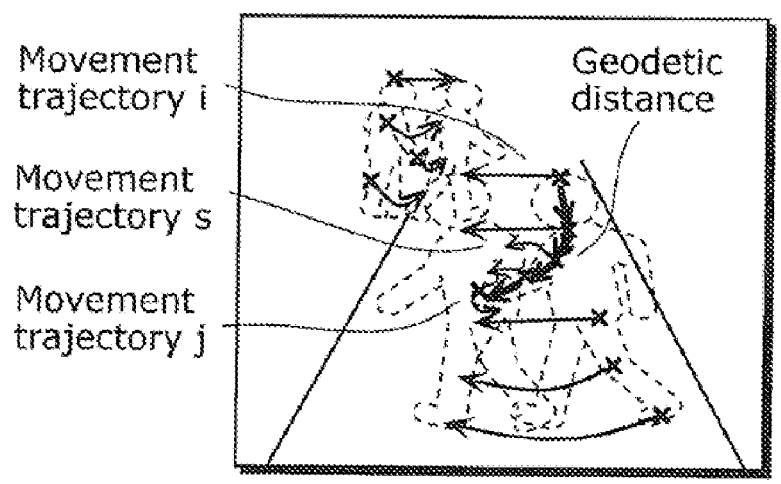
FIG. 9B is a conceptual diagram for explaining a characteristic of a geodetic distance.

FIGS. 9A and 9B shows conceptual diagrams for explaining the characteristics of a geodetic distance. For example, the linear distance between the movement trajectory i of a head-region and the movement trajectory j of a finger-region is a distance between the two movement trajectories unrelated to other movement trajectories as shown in FIG. 9A. On the other hand, the geodetic distance between the movement trajectory i of the head-region and the movement trajectory j of the finger-region is a summation of distances indicated by arrows passing through plural movement trajectories in the neighborhood and reaching the movement trajectory j as shown in FIG. 9B. In other words, the linear distance shown in FIG. 9A does not reflect distribution of other movement trajectories at all, and thus it is not possible to represent a distance between movement trajectories along the shape of an object articulated with joints like a person. Contrary to the above, the geodetic distance shown in FIG. 9B is a distance reflecting other movement trajectories, and thus it is possible to represent a distance between movement trajectories along the shape of an object articulated with joints.

As described above, the movement trajectory $x^i$ represented by Expression 1 is mathematically data of (TL×2) dimensional space at the maximum. However, it is confirmed with experimentation by the inventors that the movement trajectories detected actually from an image have the characteristic of being localized in only a small region in (T×2) space as shown in FIGS. 8B and 8C. It can be said that, for the movement trajectories with such a characteristic, the geodetic distance (the arrow in FIG. 8C) that reflects the distribution of data in the neighborhood is more suitable as a measure of a distance that represents a similarity between movement trajectories than the linear distance (the arrow in FIG. 8B) that is only a distance between two data items unrelated to the distribution of data. It is to be noted that, although the technique using Expression 7 and Expression 8 is describes as a technique used by the distance calculating unit 105 for calculating a geodetic distance from a linear distance, the technique for calculating a geodetic distance is not limited to this. For example, the distance calculating unit 105, when calculating a non-linearized distance using a linear distance, may calculate the non-linearized distance by replacing, with an infinite value, distances larger than the k-th largest distance between a movement trajectory i and a movement trajectory, instead of replacing, with an infinite value, the linear distance larger than a threshold R. The following describes in detail the distance interpolation step S206 performed by the distance interpolation unit 106. The distance interpolation unit 106 calculates and outputs an approximate geodetic distance between movement trajectories based on the geodetic distance between the NL long-term trajectories and the geodetic distance between the NS short-term trajectories which are calculated by the distance calculating unit 105.

The following describes in detail the procedure of calculating an approximate geodetic distance g(i, j) performed by the distance interpolation unit 106, using a geodetic distance $g_L(i, j)$ of the long-term trajectories and a geodetic distance $g_S(i, j)$ of the short-term trajectories.

The distance interpolation unit 106 calculates an interpolated long-term geodetic distance $g_L'(i,j)$ according to Expression 10 below using the geodetic distance $g_S(i, j)$ between the NL long-term trajectories and the geodetic distance $g_S(i, j)$ between the NS short-term trajectories.

$$g_L'(i, j) = \begin{cases} g_L(i, j) & \text{if } i, j \in X_L \\ wg_S(i, j) & \text{otherwise,} \end{cases}$$ Expression 10

$$\text{where } w = \frac{1}{N_L(N_L-1)} \sum_{k \in X_L} \sum_{l \in X_L \text{ and } k \neq l} \frac{g_L(k, l)}{g_S(k, l)}$$

Next, the distance interpolation unit 106 calculates, for the interpolated long-term geodetic distance $g_L'(i, j)$, the shortest distance among the distances of all paths that are possible to connect given two points, as shown in Expression 11 below in the same manner as the aforementioned shortest path calculation of Expression 8, and outputs a result of the calculation as an approximate geodetic distance g(i, j).

$$g(i,j)=\min(g_L'(i,j),g_L'(i,s)+g_L'(s,j),\ldots)$$ Expression 11

Here, the approximate geodetic distance g(i, j) can be calculated for NS number of movement trajectories that are the same number of movement trajectories as short-term trajectories. It can be construed, from the meaning of Expression 10 and Expression 11, that the approximate geodetic distance g(i, j) is a geodetic distance between NS virtual movement trajectories, which is interpolated by adding movement trajectories, to NL long-term trajectories, using greater numbers of NS short-term trajectories. In addition, it can also be construed differently that the approximate geodetic distance g(i, j) is a geodetic distance between virtual movement trajectories over TS frames, which is generated by extrapolating the number of pictures to short-term trajectories over TS frames, using larger numbers of long-term trajectories over TL frame. More specifically, the approximate geodetic distance g(i, j) includes information on larger numbers of movement trajectories than the geodetic distance $g_L(i, j)$ between long-term trajectories and includes information on larger number of pictures than the geodetic distance $g_S(i, j)$ between short-term trajectories. In other words, it can be said that the approximate geodetic distance g(i, j) corresponds to an approximate geodetic distance between movement trajectories for NS virtual movement trajectories over TL frames.

More specifically, the distance interpolation unit 106 calculates, as an approximate geodetic distance, a geodetic distance between NS movement trajectories over TL consecutive pictures, using a geodetic distance between NL long-term trajectories over TL consecutive pictures and a geodetic distance between NS short-term trajectories over TS consecutive pictures. In other words, the distance interpolation unit 106 calculates an approximate geodetic distance by interpolating or extrapolating one of the geodetic distance between long-term trajectories or the geodetic distance between short-term trajectories, using the other one of the geodetic distance between long-term trajectories or the geodetic distance between short-term trajectories. More specifically, as shown in Expression 10 and Expression 11, the distance interpolation unit 106 calculates an approximate geodetic distance by performing linear interpolation on a geodetic distance between long-term trajectories, using a geodetic distance between short-term trajectories.

The following describes in detail the segmentation step S207 performed by the segmentation unit 107. The segmentation unit 107 performs segmentation by identifying a group of similar movement trajectories as a single region, based on the approximate geodetic distance g(i, j) calculated by the distance interpolation unit 106.

It is assumed in the present embodiment that the segmentation unit 107 performs dimensionality reduction on a higher-dimensional space represented by the approximate geodetic distance g(i, j), and then performs clustering in the space on which dimensionality reduction is performed.

The dimensionality reduction can be achieved by performing Young-Householder transformation and then calculating Eigensystem. The dimensionality reduction is a method for effectively projecting data distributed in a multidimensional space, on a low-dimensional space.

The following describes a procedure with which the segmentation unit 107 performs dimensionality reduction on an approximate geodetic distance g(i, j).

As shown in Expression 12 below, an NS×NS matrix of the approximate geodetic distance g(i, j) is represented as an approximate geodetic distance matrix G.

$$G = \{g(i,j)\} \qquad \text{Expression 12}$$

The segmentation unit 107 performs, on an approximate geodetic distance matrix G, Young-Householder transformation in which a centering matrix H is multiplied from the both sides. This is to transform the distance matrix composed of a distance between points, to a distance matrix having a median point as a position of the origin.

$$\tau(G) = \frac{HG^{(2)}H}{2} \qquad \text{Expression 13}$$

Here, H denotes a centering matrix.

$$H_{ij} = (I - 1/NS) \qquad \text{Expression 14}$$

I denotes a unit matrix and NS denotes the number of movement trajectories.

Furthermore, the following expression is satisfied.

$$G^{(2)} = \{g(i,j)^2\} \qquad \text{Expression 15}$$

Next, the segmentation unit 107 calculates, in order to perform dimensionality reduction, a P number of eigen vectors $e_p$ with respect to T(G) and a P number of eigen values $\mu_p$ corresponding to the eigen vectors $e_p$.

With this, the following expression is satisfied, from Expression 11.

$$g^i = (g(i,1), g(i,2), \ldots, g(i,N_S)) \qquad \text{Expression 16}$$

In this case, the result of projecting $g^i$ in a space on which dimensionality reduction is performed can be represented as data $z_p^i$ by the following expression.

$$z_p^i = \sqrt{\lambda_p} e_p^i \qquad \text{Expression 17}$$

It is to be noted that $e_p^i$ is the ith element of the pth eigen vector $e_p$. The segmentation unit 107 may experimentally determine the number of the eigen vectors "P" according to a scene used, or based on a result of calculating a contributing rate $a_p$ from the eigen value $\lambda_p$ as below.

$$a_p = \frac{\sum_{p=1}^{P} \lambda_p}{\sum_{p=1}^{N} \lambda_p} \qquad \text{Expression 18}$$

Here, P is the number of eigen vectors that are used, that is, the number of dimensions in a reduced space. N is the number of all of the eigen vectors. Thus, the segmentation unit 107 can determine, as the number of the eigen vectors, the number P at the time when the contributing rate $a_p$ becomes equal to or more than a constant value.

As described above, the segmentation unit 107 performs dimensionality reduction on an approximate geodetic distance g(i, j) by performing calculation shown in Expression 12 to Expression 17. With this, the segmentation unit 107 can associate the approximate geodetic distance $g^i$ calculated by the distance interpolation unit 106 and a corresponding virtual movement trajectory, with the data $z_p^i$ in the space on which dimensionality reduction is performed which is represented by the eigen vector $e_p$.

Figure 10A:
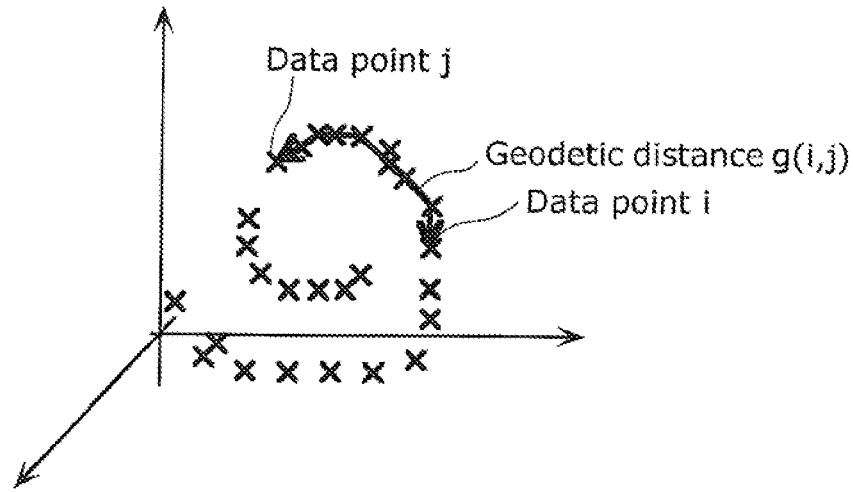
FIG. 10A is a diagram for explaining an example of clustering using an approximate geodetic distance.
Figure 10B:
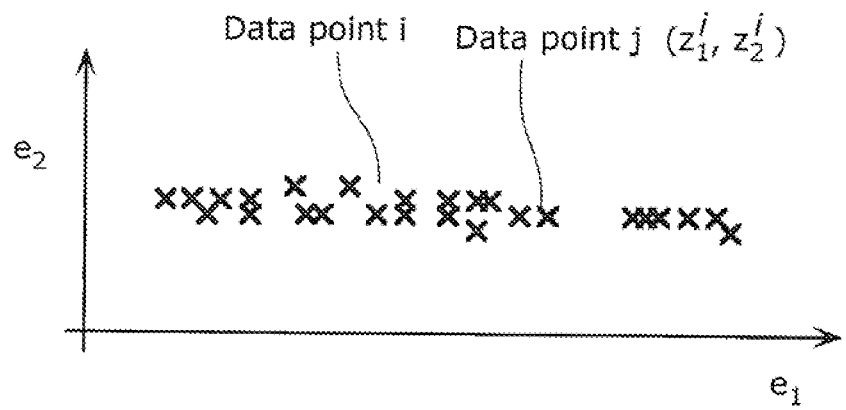
FIG. 10B is a diagram for explaining an example of clustering using an approximate geodetic distance.
Figure 10C:
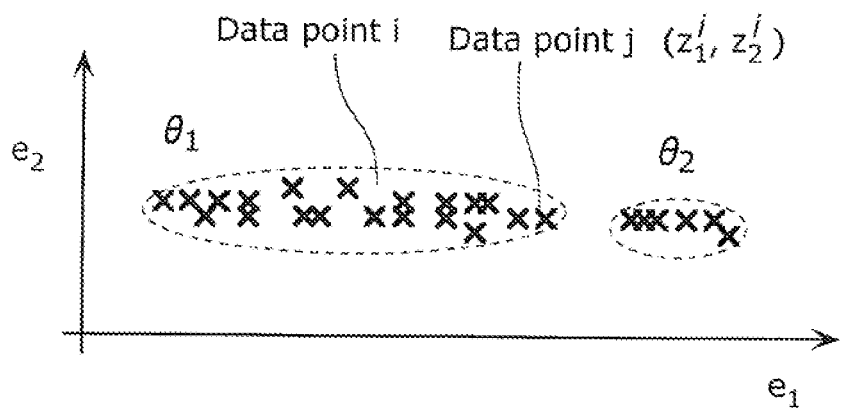
FIG. 10C is a diagram for explaining an example of clustering using an approximate geodetic distance.

FIGS. 10A to 10C shows diagrams for explaining an example of clustering using an approximate geodetic distance. It is to be noted that FIGS. 10B and 10C also shows a result of projecting, on a space on which dimensionality reduction is nonlinearly performed, a temporal movement trajectory of a pixel i, when an image of a walking person is inputted. The vertical axis and the horizontal axis of the graph shown in FIGS. 10B and 10C are an eigen vector $e_1$ and $e_2$, respectively. The points $(z_1^i, z_2^i)$ projected on the two-dimensional space are projection of the approximate geodetic distance $g^i$. Here, the data $z_p^i$ on a nonlinear space and the movement trajectory $x^i$ of the pixel i in an image are in a one-to-one correspondence relationship, and thus it can be said that the point $(z1^i, z2^i)$ corresponds to the movement trajectory $x^i$ of the pixel i. It is to be noted that the number of dimensions of the nonlinear space is set at two dimension in order to visualize the result, however, it is not necessarily to be two dimension as described above, and data can be projected with higher accuracy in a higher dimension.

Next, the segmentation unit 107 performs clustering on data $z_p^i$ obtained by dimensionally reducing the movement trajectories shown in FIG. 10B, thereby segmenting the movement trajectories and detecting a moving object. The present embodiment employs a technique of clustering movement trajectories such that the smallest within-class variance is obtained when the number of classes is given.

First, a segmentation region is expressed as below.

$$\theta = \{\theta_1, \ldots \theta_m \ldots \theta_M\} \qquad \text{Expression 19}$$

Here, M denotes the number of segmentation regions and is empirically determined according to a scene used.

$$\overline{Z_m}$$

Each of the segmentation regions $\theta_m$ is expressed by the above parameter and a parameter $Z_m$.

$$\overline{Z_m}$$

Here, the above parameter is an average value of data coordinate values that belong to the segmentation region $\theta_m$ in the space on which dimensionality reduction is performed. In addition, the parameter $Z_m$ is a covariance matrix regarding the data coordinate values that belong to the segmentation region $\theta_m$.

$$\overline{Z_m}$$

The segmentation unit 107 may determine an initial value in a random manner, or may segment the reduced nonlinear space by placing a grid at equal distances, for example, and determine the coordinate value of intersection of the grids as the initial value.

It is to be noted that the parameter below and a parameter $Z_m$ can be expressed as in Expression 20 and Expression 21 below.

$$\overline{Z_m} = \begin{bmatrix} \overline{z_1^m} \\ \vdots \\ \overline{z_P^m} \end{bmatrix} \qquad \text{Expression 20}$$

-continued $$Z_m = \frac{1}{C_m} \sum_{c_m=1}^{C_m} \begin{bmatrix} z_1^{c_m} - \overline{z_1^m} \\ \vdots \\ z_P^{c_m} - \overline{z_P^m} \end{bmatrix} [z_1^{c_m} - \overline{z_1^m} \ \Lambda \ z_P^{c_m} - \overline{z_P^m}]$$ Expression 21

Here, $C_m$ is the number of data items that belong to the segmentation region $\theta_m$ in the reduced nonlinear space.

The following describes a specific method of clustering. First, the segmentation unit 107 calculates the segmentation region $\theta_m$ to which data $z_i$ belongs, using a distance function of the following Expression 22.

$$\psi_m(z_i) = \phi_m(z_i) + \ln|Z_m| - \ln p(\omega_m)$$ Expression 22

Here, $\psi_m(z_i)$ denotes a distance between data $z_i$ that corresponds to the movement trajectory of the pixel i and each of the segmentation regions $\theta_m$. It is assumed that each of the data items belongs to the segmentation region $\theta_m$ in which $\psi_m(z_i)$ indicates a minimum value. It is to be noted that $\phi_m(z_i)$ is a Mahalanobis' generalized distance and is expressed by the following Expression 23.

$$\phi_m(z_i) = (z_i - \overline{z_m})^t Z_m^{-1} (z_i - \overline{z_m})$$ Expression 23

Here, the segmentation unit 107 may use $\phi_m(z_i)$ instead of $\psi_m(z_i)$ for calculation.

Furthermore, $p(\omega_m)$ may be a constant value, or when performing segmentation on a given object such as a person, may be a value determined in advance based on a shape, an area ratio, or the like of a part of the person. It is to be noted that $\omega_m$ denotes a weight coefficient for the segmentation region $\theta_m$.

Next, the segmentation unit 107 updates a parameter of the segmentation region $\theta_m$ and a parameter $Z_m$ as shown in the following Expression 24 and Expression 25, from a result of calculation of Expression 22, using the data $z_i$ that belongs to the segmentation region $\theta_m$.

$$\overline{z_m}$$ Expression 24

$$\overline{z_m} = \frac{\sum_{c_m=1}^{C_m} \omega_{c_m} z_{c_m}}{\sum_{c_m=1}^{C_m} \omega_{c_m}}$$

$$Z_m = \frac{\sum_{c_m=1}^{C_m} \omega_{c_m}^2 (z_{c_m} - \overline{z_m})(z_{c_m} - \overline{z_m})'}{\sum_{c_m=1}^{C_m} \omega_{c_m}^2}$$ Expression 25

Here, $z_{c_m}$ is data in the reduced nonlinear space that belongs to the segmentation region $\theta_m$. In addition, $\omega$ may be a constant value "1" or a value adjusted according to the difference from the average value of input data. As described above, the segmentation unit 107 can calculate the segmentation region $\theta_m$ to which each data in the nonlinear space belongs, by repeating distance calculation from Expression 22 to Expression 25 and update of a parameter predetermined number of times. It is to be noted that the segmentation unit 107 may calculate the segmentation region using, in addition to the above method, a different clustering method such as k-means, competitive learning, or the like.

FIG. 10C is a diagram which shows an example in which data on the nonlinear space is segmented where M=3. When observing the correspondence, on an image, of the segmentation regions $\theta_1$ to $\theta_2$ in the reduced nonlinear space, $\theta_1$ corresponds to a person positioned in front and $\theta_2$ corresponds to a person positioned behind. It is to be noted that movement trajectories of a background region are also practically included and the background region is segmented as a region $\theta_3$, however, the background region is omitted for convenience of notation.

Here, a result of tracking a pixel, not only in a region on a single image but also over temporally consecutive plural images, corresponds to the segmentation region in the reduced nonlinear space. More specifically, the segmentation unit 107 can extract an image region for each object moving in an image, as a result of temporally tracking a region of the object moving in the image, by performing segmentation in the reduced nonlinear space. In addition, failure in segmentation due to an error in detecting a human candidate region does not occur because it is not necessary to specify the human candidate region as preprocessing in the moving object detection apparatus 100. As described above, the moving object detection apparatus 100 stably performs segmentation on an image including a person or the like which moves changing its shape, by performing clustering in a nonlinear space without requiring fitting of a vast quantity of parameters. Accordingly, it is possible to detect a moving object in the image.

Lastly an output step S204 performed by the output unit 104 is described in detail. The output unit 104 generates and displays on the display 1003 an image based on the segmentation region $\theta_m$ of a movement trajectory.

In the present embodiment, the output unit 104 performs image processing on, and outputs to the display 1003, the video captured by the image input unit 101 so as to be displayed, for example, in a different mode per region of the movement trajectories identified by the moving object detection unit 103. Here, the output unit 104 selects a different color per a segmentation region $\theta_m$ of movement trajectories and draws an pixel of image coordinate position of each of the movement trajectories, thereby generating an image.

Figure 11A:
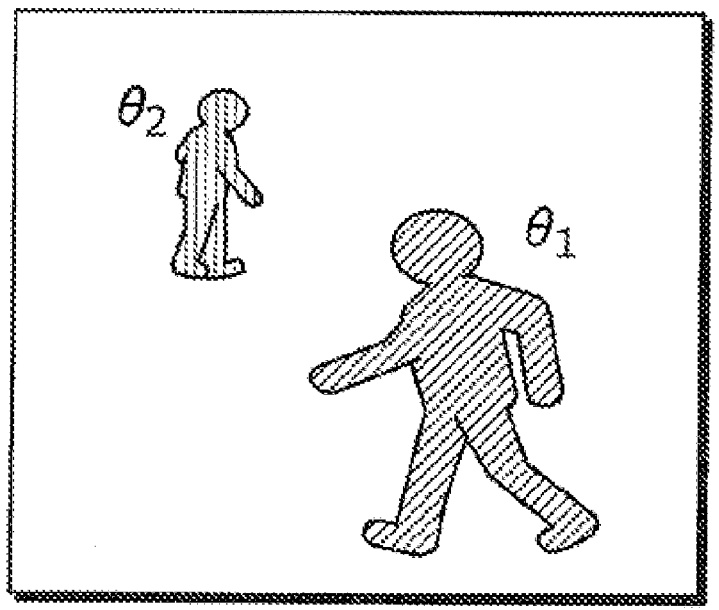
FIG. 11A is a diagram which shows an example of an image generated by an output unit.
Figure 11B:
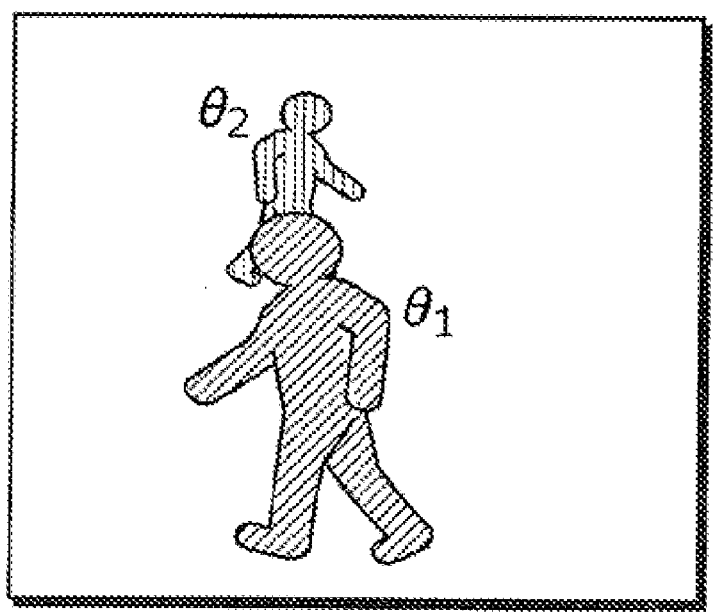
FIG. 11B is a diagram which shows an example of an image generated by an output unit.

FIGS. 11A and 11B is a diagram which shows an example of an image generated in an output unit 104. As shown in FIGS. 11A and 11B, an image having a different color for each of the clustered movement trajectories is displayed on the display 1003.

It is to be noted that the output unit 104 generates an image by drawing, with a color corresponding to a segmentation region, a pixel at an image coordinate position of a movement trajectory, however, the method of generating an image is not limited to this. The output unit 104 can draw all pixels in an image with a color corresponding to a cluster, using the method described above, when the number of movement trajectories is equal to the number of pixels in the entire image. On the other hand, in the case where the number of movement trajectories is less than the number of pixels in the entire image, a pixel that does not match any image coordinate position of movement trajectories exists.

The output unit 104 may draw, with a method different from the above method, such a pixel that does not match an image coordinate position of any movement trajectories. For example, the output unit 104 may draw a pixel that belongs to a block used by the motion analysis unit 102 for motion estimation for generating a movement trajectory, with the color same as that of the segmentation region of the movement trajectory.

In addition, as another method of drawing a pixel that does not match an image coordinate position of any movement trajectories, the output unit 104 may draw the pixel with the same color as that of a segmentation region of the movement trajectory positioned closest.

In addition, as yet another method of drawing a pixel that does not match an image coordinate position of any movement trajectories, the output unit 104 may connect image coordinate positions (points) of plural movement trajectories by Delaunay triangulated mesh generating method, and draw a pixel included in a triangle surrounded by three points belonging to the same segmentation region with the color same as that of the segmentation region.

It is to be noted that, when processing a video consecutively inputted, the moving object detection apparatus 100 may repeat the aforementioned Steps S201 to S207 shown in FIG. 3 every time a TL number of pictures are inputted.

As described above, the moving object detection apparatus according to the present embodiment performs clustering on a movement trajectory based on a similarity between movement trajectories in video to extract a region of a moving object in an image. Furthermore, the moving object detection apparatus uses a geodetic distance between movement trajectories as an index of similarity between the movement trajectories, thereby enabling region extraction of a moving object in an image irrespective of change in a shape of an object or change in a posture of an articulated object.

Furthermore, the moving object detection apparatus according to the present embodiment performs clustering on a movement trajectory, using, as an index of similarity, an approximate geodetic distance between plural movement trajectories calculated by the distance interpolation unit 106. Here, in calculation of a similarity between movement trajectories, it is possible to calculate a similarity between movement trajectories over longer time as movement trajectories for larger number of pictures are used. Thus, it is effective to use movement trajectories over the larger number of pictures in order to obtain an accurate result of clustering. However, the number of movement trajectories which can be calculated decreases as the larger number of pictures are used, as described above. As a result, disparity of density between movement trajectories becomes large, causing the moving object detection apparatus to make an error in segmentation. On the other hand, in the case where a smaller number of pictures are used, the number of movement trajectories which can be calculated increases, however, the difference of a similarity between movement trajectories decreases. Thus, in particular, a movement trajectory is generated which shows a different motion in a long amount of time but shows a similar motion in a short amount of time, causing the moving object detection apparatus to make an error in segmentation. In order to resolve such a dilemma, the moving object detection apparatus according to the present embodiment performs clustering on movement trajectories using an approximate geodetic distance obtained using increased number of movement trajectories with the short-term trajectories with respect to the long-term trajectories.

Figure 12:
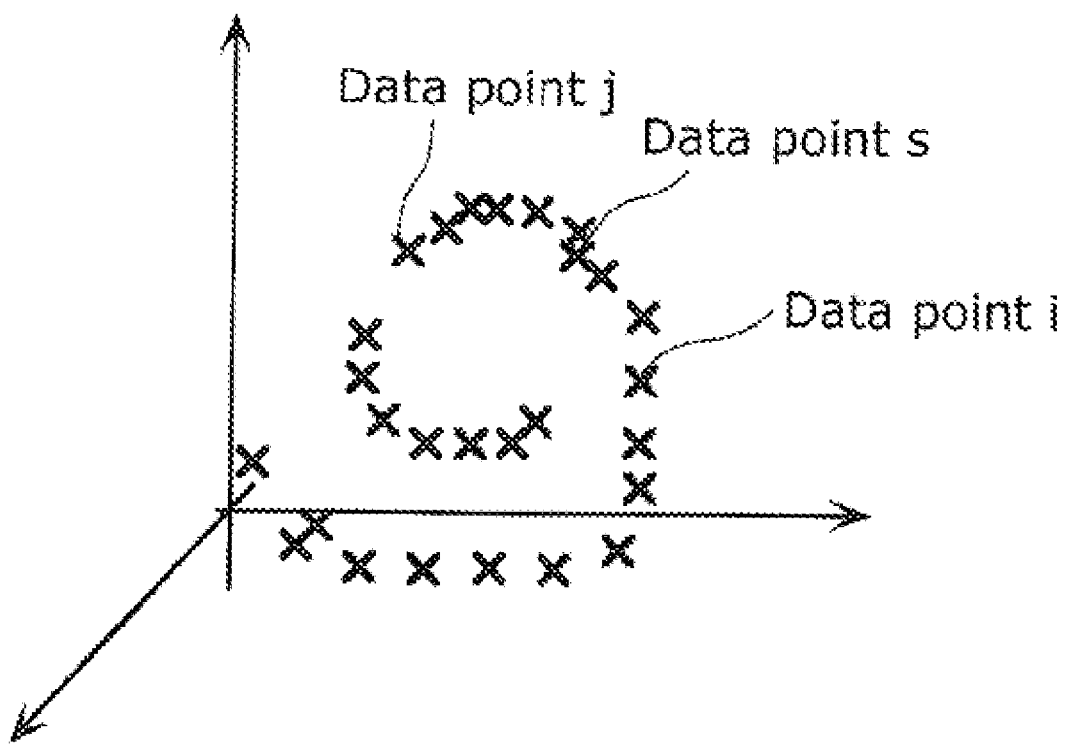
FIG. 12 is a conceptual diagram which shows a distribution of ideal movement trajectories.
Figure 13:
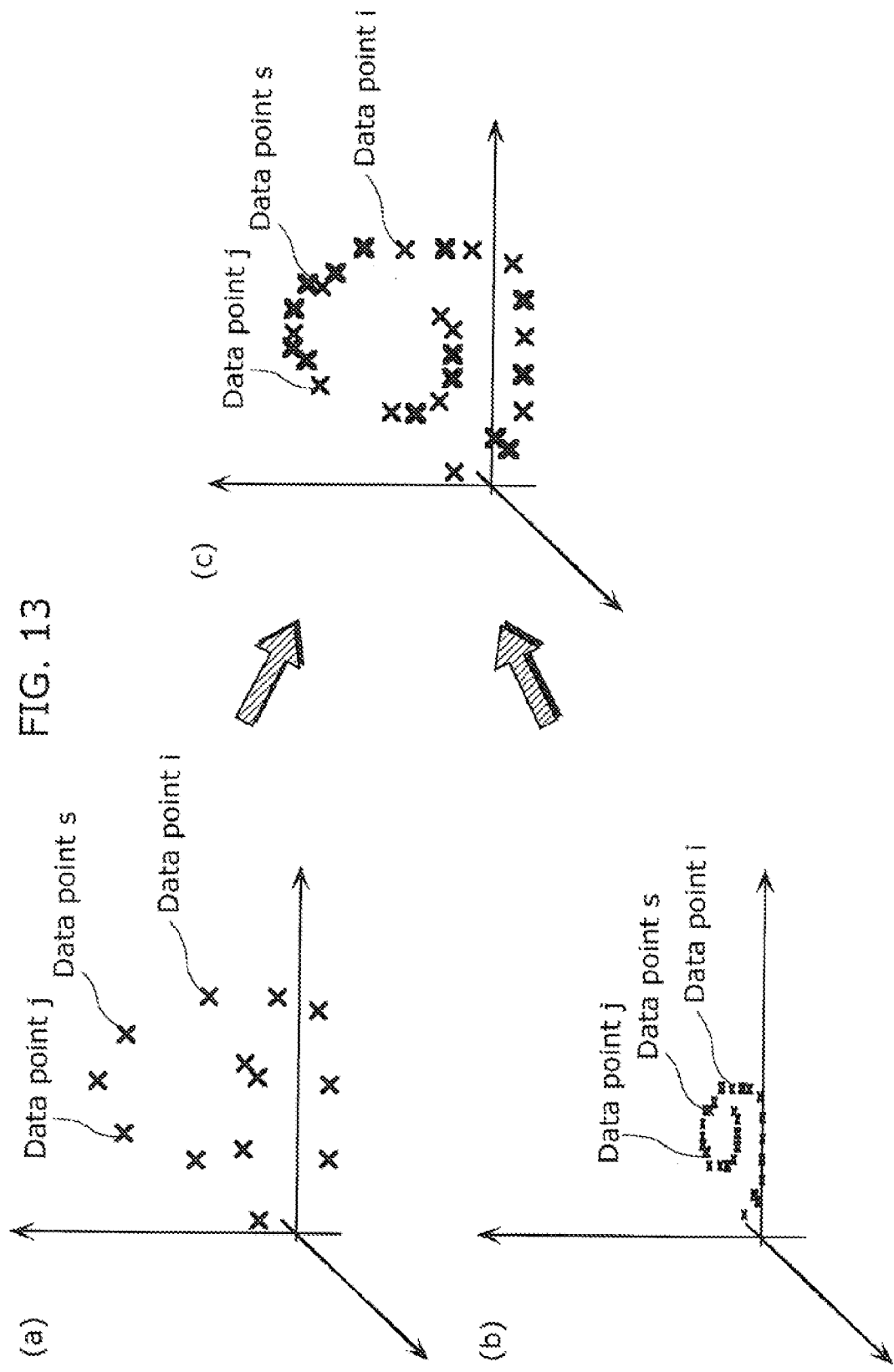
FIG. 13 is a diagram for explaining an advantageous effect produced by the moving object detection apparatus according to the embodiment of the present invention.

The following describes an example of the above with reference to FIG. 12 and FIG. 13. FIG. 12 is a conceptual diagram showing an ideal distribution of movement trajectories in which all movement trajectories can be tracked over TL frames in a scene similar to FIG. 4 and FIG. 5. However, since the number of movement trajectories, in practice, decreases due to occlusion or the like, as the number of pictures increases, the distribution becomes that shown in FIG. 13(a). In the case where the moving object detection apparatus 100 calculates a geodetic distance using non-dense movement trajectories as shown in FIG. 13(a) and performs clustering using the calculated geodetic distance, there is a high possibility that an erroneous clustering is performed. On the other hand, when movement trajectories over smaller number of pictures are used, the number of movement trajectories becomes closer to an ideal state, however, the difference of similarities between movement trajectories decreases. In such a case, the approximate geodetic distance is calculated based on both of the long-term trajectories and the short-term trajectories, which corresponds to calculating a geodetic distance based on movement trajectories close to an ideal distribution shown in FIG. 12, as shown in FIG. 13(c).

As described above, with the moving object detection apparatus and method according to the present embodiment, it is possible to perform region extraction of a moving object in an image irrespective of the posture of an articulated object, as a result of temporally tracking a region of the object moving in the image, by performing clustering based on the similarity between the movement trajectories in the image. Furthermore, since it is not necessary to set a human candidate region as preprocessing, no failure occurs in region extraction due to an error in detecting the human candidate region. As described above, by performing clustering based on the geodetic distance between movement trajectories without requiring fitting of a vast quantity of parameters, it is possible to stably perform region extraction of an image including a human or the like that moves changing its shape, thereby enabling detection of the moving object in the image with a high accuracy.

It is to be noted that, in the moving object detection apparatus according to the present embodiment, the distance interpolation unit 106 calculates an approximate geodetic distance using the Expression 10 and Expression 11 above, based on the geodetic distance between the long-term trajectories and the geodetic distance between the short-term trajectories, however, the present invention is not limited to these expressions. The distance interpolation unit 106 may calculate an approximate geodetic distance $g(i, j)$ using a different expression as long as the approximate geodetic distance is calculated so as to include: information of more movement trajectories than the geodetic distance $g_L(i, j)$ between the long-term trajectories; and information of more pictures than the geodetic distance $g_S(i, j)$ between the short-term trajectories. The distance interpolation unit 106 may, for example, calculate an interpolated long-term geodetic distance $g_L'(i, j)$ using Expression 30 below instead of Expression 10, and then calculate the approximate geodetic distance $g(i, j)$ using Expression 11.

Expression 30
$$g_L'(i, j) = \begin{cases} g_L(i, j) & \text{if } i, j \in X_L \\ w(i, j)g_S(i, j) & \text{otherwise,} \end{cases}$$

where $$w(i, j) = \frac{1}{\hat{c}(i, j)} \sum_{k \in X_L} \sum_{l \in X_L \text{ and } k \neq l} c(i, j, k, l) \frac{g_L(k, l)}{g_S(k, l)}$$

$$c(i, j, k, l) = \frac{1}{g_S(i, k) + g_S(i, l) + g_S(j, k) + g_S(j, l)}$$

$$\hat{c}(i, j) = \sum_{k \in X_L} \sum_{l \in X_L \text{ and } k \neq l} c(i, j, k, l)$$

Expression 30 represents, when a geodetic distance between long-term trajectories is interpolated using a geodetic distance between short-term trajectories, performing weighted linear interpolation so that a weight w becomes larger as the geodetic distance between short-term trajectories is smaller. More specifically, the distance interpolation unit 106 may calculate an approximate geodetic distance by performing weighted linear interpolation so that a weight becomes larger as the geodetic distance between short-term trajectories is smaller when a geodetic distance between long-term trajectories is linearly interpolated using a geodetic distance between short-term trajectories. Performing linear interpolation with weighting as above allows the distance interpolation unit 106 to calculate an approximate geodetic distance with a further local distribution of the geodetic distance between short-term trajectories being maintained. Thus, the moving object detection apparatus can extract a region of a moving object with a higher accuracy by using an approximate geodetic distance calculated as described above.

It is to be noted that, in the moving object detection apparatus according to the present embodiment, the distance interpolation unit 106 uses the geodetic distance $g_S(i,j)$ of all of the short-term trajectories when calculating an approximate geodetic distance between given two movement trajectories, however, it is not limited to the method that uses all of the short-term trajectories. For example, the approximate geodetic distance may be calculated by extracting a part of short-term trajectories and using the geodetic distance $g_S(i,j)$ of the extracted short-term trajectories. More specifically, when the approximate geodetic distance $g(i,j)$ between a movement trajectory i and a movement trajectory j is calculated, for example, short-term trajectories similar to the movement trajectories i and short-term trajectories similar to the movement trajectories j are extracted, to be a partial short-term trajectory, from among all of the short-term trajectories. Then, the interpolated long-term geodetic distance j) is calculated by Expression 10 and Expression 30, using the geodetic distance $g_S'(i,j)$ of the extracted partial short-term trajectory, instead of the geodetic distance $g_S(i,j)$ of all of the short-term trajectories. Lastly, the approximate geodetic distance $g(i,j)$ is calculated from the interpolated long-term geodetic distance $g_L'(i,j)$, using Expression 11.

More specifically, the distance interpolation unit 106 may extract a partial short-term trajectory that is a group of similar short-term trajectories, based on the geodetic distance between short-term trajectories, and calculate an approximate geodetic distance based on the extracted partial short-term trajectory. Thus, the distance interpolation unit 106 may extract, as a partial short-term trajectory, a group of short-term trajectories of which the geodetic distances therebetween are similar to each other, and calculate the approximate geodetic distance using the extracted partial short-term trajectory. With this, the moving object detection apparatus 100 can calculate an approximate geodetic distance $g(i,j)$ using a short-term trajectory of a moving object having motion the same as or similar to a moving object corresponding to the movement trajectory i and the movement trajectory j even when plural moving objects having different motion are included, for example, so that an approximate geodetic distance $g(i,j)$ can be calculated with a higher accuracy, and thus it is possible to extract a region of a moving object with a high accuracy.

It is to be noted that, in the moving object detection apparatus according to the present embodiment, the distance interpolation unit 106 performs calculation assuming that neither the geodetic distance $g_L(i,j)$ of long-term trajectories nor the geodetic distance $g_S(i,j)$ of short-term trajectories includes an infinite ($\infty$) value in its element, when performing calculation of Expression 10 and Expression 30. When an infinite value is included as a value of a geodetic distance, that is, when the distance between a movement trajectory i and a movement trajectory j is infinite, it is preferable that the distance interpolation unit 106 divides the movement trajectories into two partial groups (partial movement trajectories) of plural movement trajectories of which a geodetic distance between the movement trajectory i is finite and plural movement trajectories of which a geodetic distance between the movement trajectory j is finite. Then, it is preferable that each processing unit performs subsequent processes by treating each of the divided partial groups as a cluster different from each other.

More specifically, the distance interpolation unit 106 may extract plural partial short-term trajectories that are groups of similar short-term trajectories, based on the geodetic distance between short-term trajectories, and calculate an approximate geodetic distance based on the extracted partial short-term trajectories. Thus, the distance interpolation unit 106 may extract, as partial short-term trajectories, groups of short-term trajectories of which the geodetic distances between short-term trajectories are finite, and calculate the approximate geodetic distance for each of the extracted partial short-term trajectories. In this case, the segmentation unit 107 identifies, as a single region, a group of similar movement trajectories for each approximate geodetic distance calculated from the same partial short-term trajectories. This enables the moving object detection apparatus 100 to extract a region of a moving object with a high accuracy even when the extracted short-term trajectories include a combination of short-term trajectories from which an appropriate geodetic distance cannot be calculated.

It is to be noted that, in the moving object detection apparatus according to the present embodiment, the number of pictures TL of the long-term trajectories and the number of pictures TS of the short-term trajectories extracted by the distance calculating unit 105 from the movement trajectories generated by the motion analysis unit 102 are TL=30 and TS=10, respectively, however, the numerical values are not limited to these values. For example, another numerical value may be used according to a type or status of a moving object to be detected.

For example, when a target of detection is assumed to be a walking person, since an average walking cycle is approximately 1 second (30 frames), the long-term trajectory over pictures of TL=30 frames represents information on motion that is normalized by walking cycle of a person. It can be said that the movement trajectory that is normalized by walking cycle is more suitable for representing a difference in a moving direction per a walking person than some movement trajectories that are shorter than the walking cycle. Thus, it can be said that extracting the long-term trajectories with the number of pictures TL of the long-term trajectories being set as 30 is suitable when extracting a moving object per a walking person from video including plural walking people is aimed at. On the other hand, for a region which is temporally occluded during the walking cycle, such as one leg or hand, the movement trajectory over pictures for one walking cycle cannot be extracted. Accordingly, it is possible for the distance calculating unit 105 to extract a short-term trajectory for such a region of which a movement trajectory for one cycle cannot be calculated, by setting the number of pictures TS of a short-term trajectory as 10 that is the number of pictures from which movement trajectory can be extracted. The moving object detection apparatus 100 can detect or extract a moving object region for a region that is temporally occluded, by employing a short-term trajectory extracted as described above.

As described above, when a target of detection is a moving object having a periodical change in shape, the influence of change in shape of the moving object is reduced by setting the number of pictures (TL) of a long-term trajectory to be extracted by the distance calculating unit 105 as the number of pictures corresponding to a cycle of change in shape of the moving object, thereby producing an advantageous effect of enabling more accurate extraction of the moving object. In addition, there is an advantageous effect that it is possible to detect a moving object region corresponding more accurately to a region of a moving object, for a moving object region in a picture in which a long-term trajectory cannot be calculated, by setting the maximum number of pictures in which movement trajectories can be calculated as TS, in order to detect whether or not a moving object is included.

It is to be noted that, in the moving object detection apparatus according to this embodiment, the temporal positional relationship between the long-term trajectories over TL frames and the short-term trajectories over TS frames which are extracted by the distance calculating unit 105 from the movement trajectories generated by the motion analysis unit 102 is the positional relationship as shown in FIG. 7, however, it is not limited to this. Any positional relationship may be accepted as long as a picture of TS frame is included in the TL frame. For example, even when the temporal positional relationship between the long-term trajectories and the short-term trajectories is represented as shown is FIGS. 14A and 14B, the same processing as in the positional relationship shown in FIG. 7 can be performed by the distance calculating unit 105.

Figure 14A:
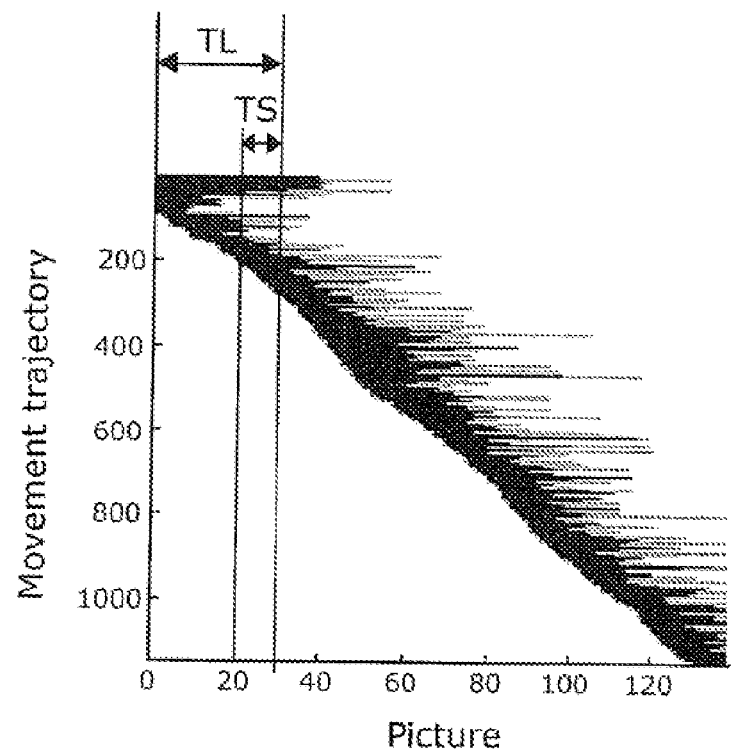
FIG. 14A is a diagram which shows another example of a relationship between a picture for calculating long-term trajectories and a picture for calculating short-term trajectories.

In the case where a positional relationship of pictures is relatively different between the pictures in which short-term trajectories are extracted and pictures in which long-term trajectories are extracted as in FIG. 7 and FIGS. 14A and 14G, a weight of each picture reflected to an approximate geodetic distance calculated by the distance interpolation unit 106 using the distance of the short-term trajectory and the distance of the long-term trajectory changes. In the case of FIG. 7, for example, the short-term trajectories extracted from the first frame to the TSth frame, in the pictures from the first frame to the TSth frame, can be used for detecting a moving object. On the other hand, a moving object cannot be detected using a movement trajectory in a region which is temporally occluded from the first frame to the TSth frame and exists in a picture from the subsequent (TS+1) frame to the TLth frame. Thus, in the case where the degree of importance of a result of extracting a moving object from the first frame to the TLth frame is different among pictures, the distance calculating 105 unit determines a positional relationship of pictures such that a picture with higher degree of importance is included in a picture from which a short-term trajectory is extracted. For example, when a first picture is most important among pictures from the first frame to the TLth frame, the distance calculating unit 105 determines the arrangement of pictures of which a short-term trajectory is extracted to be the arrangement shown is FIG. 7. On the other hand, when it is desirable that a delay time is small from the time when a moving object is shot to the time when the moving object is detected by an apparatus, the distance calculating unit 105 determines the arrangement of pictures from which a short-term trajectory is extracted to be the arrangement shown is FIG. 14B.

Figure 14B:
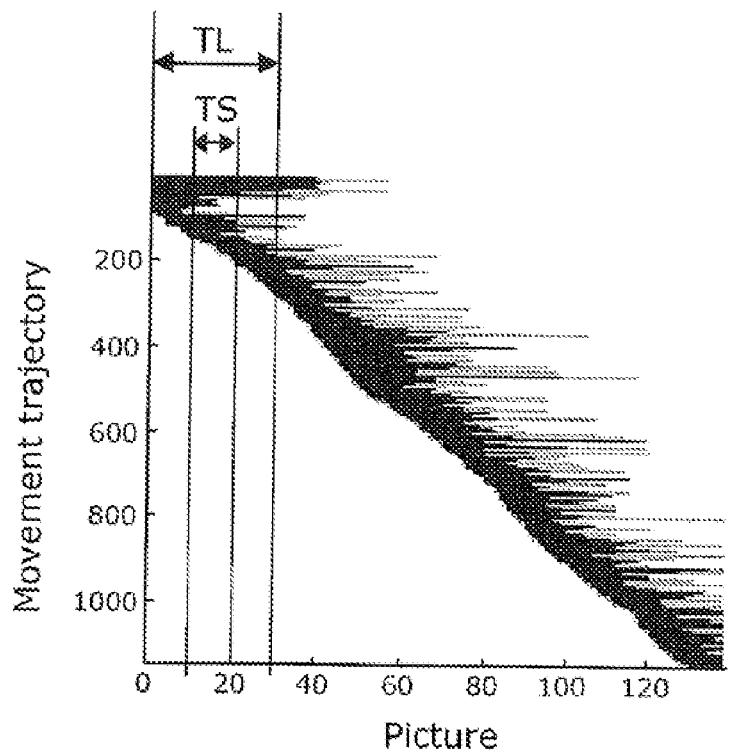
FIG. 14B is a diagram which shows another example of a relationship between a picture for calculating long-term trajectories and a picture for calculating short-term trajectories.

In addition, the distance calculating unit 105 may perform the same processing on pictures from the first frame to the TLth frame using short-term trajectories over TS frames with different arrangement, as in the relationship shown in FIG. 7 and FIGS. 14A and 14B, to produce a result of extracting a moving object region.

It is to be noted that, in the moving object detection apparatus according to the present embodiment, it has been described that the number of pictures TL of a long-term trajectory and the number of pictures TS of a short-term trajectory which are extracted by the distance calculating unit 105 from a movement trajectory are specified in advance and constant, however, the number of pictures used for calculating each of the movement trajectories may be dynamically changed. More specifically, the distance calculating unit 105 may extract a long-term trajectory by changing the number of pictures TL of the long-term trajectory according to the number of long-term trajectories to be extracted. In addition, the distance calculating unit 105 may extract a short-term trajectory by changing the number of pictures TS of the short-term trajectory according to the number of short-term trajectories to be extracted With this, the distance calculating unit 105 can change the number of pictures of a movement trajectory according to the characteristics of a moving object included in plural pictures, and thus it is possible to extract the larger number of movement trajectories over the larger number of pictures. Thus, since the moving object detection apparatus 100 can use a movement trajectory including larger amount of information, it is possible to perform segmentation with a higher accuracy.

To be specific, as a technique for dynamically changing the number of pictures TL of the long-term trajectory and the number of pictures TS of the short-term trajectory, for example, the distance calculating unit 105 may specify in advance an upper limit number of movement trajectories for one or both of the long-term trajectories and the short-term trajectories and dynamically change the number of pictures TL or TS so as not to significantly exceed the upper limit. More specifically, the distance calculating unit 105 may increase the number of pictures TL when the number of long-term trajectories over TL pictures exceeds an upper limit NLmax (a first upper limit) of the number of long-term trajectories specified in advance. In addition, as also for the number of pictures of short-term trajectories, the distance calculating unit 105 may increase the number of pictures TS when the number of short-term trajectories over TS pictures exceeds an upper limit NLmax (a second upper limit) of the number of short-term trajectories specified in advance. The distance calculating unit 105 can extract an appropriate number of movement trajectories over larger number of pictures, by extracting once again movement trajectories over increased number of pictures. Here, when a large number of movement trajectories are given, it is possible to calculate a large number of corresponding points over plural pictures, for such reasons as change in video being small, motion of an object being small, and occluded region due to motion being small. In this case, it is possible to include, in a movement trajectory, motion information over more pictures, by increasing the number of pictures TL or TS, and thus it can be expected that a moving object can be accurately detected based on the movement trajectory.

In addition, as another technique for dynamically changing the number of pictures TL of the long-term trajectory and the number of pictures TS of the short-term trajectory, the distance calculating unit 105 may specify in advance a lower limit of the number of movement trajectories of one or both of the long-term trajectories and the short-term trajectories, and dynamically change the number of pictures TL or TS so as not to fall below the lower limit. More specifically, the distance calculating unit 105 may decrease, when the number of long-term trajectories over pictures TL falls below a predetermined lower limit NLmin (a first lower limit) of the number of long-term trajectories, the number of pictures TL such that the number of long-term trajectories exceeds NLmin. In addition, as also for the number of pictures of short-term trajectories, the distance calculating unit 105 may decrease the number of pictures TS when the number of short-term trajectories over TS pictures falls below a predetermined lower limit NLmin (a second lower limit) of the number of short-term trajectories. The distance calculating unit 105 can secure as many as pictures, while retaining the movement trajectories not to fall below the predetermined number of movement trajectories, by extracting once again the movement trajectories over decreased number of pictures as described above. Thus, it is less likely to occur that the number of movement trajectories extremely decreases in video in which the number of long-term trajectories is relatively small due to occlusion caused by a motion of an object in the video, for example. This results in an advantageous effect that it is less likely to occur that segmentation cannot be performed.

It is to be noted that the moving object detection apparatus and method according to the present invention is not limited to the embodiment described above, but includes an embodiment obtained by modifying the above-described embodiment by those skilled in the art and an embodiment obtained by arbitrarily combining components in plural embodiments including variations described thus far.

For example, the distance calculating unit 105 of the moving object detection apparatus according to the above embodiment calculates a geodetic distance, using a threshold R that is a constant value specified in advance. However, the distance calculating unit 105 according to the present invention is not limited to the above. For example, the distance calculating unit 105 may calculate a geodetic distance while gradually decreasing the threshold R. In this case, the distance calculating unit 105, the distance interpolation unit 106, and the segmentation unit 107 may repeatedly perform distance calculation, distance interpolation, and segmentation, respectively, per a threshold R that gradually decreases, and end the processing when a predetermined condition is satisfied.

It is to be noted that, in the moving object detection apparatus according to the present embodiment, the segmentation unit 107 uses a technique by which dimensionality reduction is performed on an approximate geodetic distance g(i, j) through the processes expressed by Expression 12 to Expression 17, and then clustering is performed on movement trajectories such that the smallest within-class variance is obtained when the number of classes is given, using the geodetic distance on which dimensionality reduction is performed. However, the technique of segmentation is not limited to this. The segmentation unit 107 may use other technique as long as an approximate geodetic distance is used for clustering movement trajectories.

In addition, the result of segmentation is indicated on a display in the above embodiment, however, the result may be used for motion estimation of a moving object. More specifically, the moving object detection apparatus according to the present invention may include a motion estimation unit 150 in addition to the components according to the embodiments described above.

FIG. 15A is a diagram which shows a configuration of a moving object detection apparatus according to a modification example of the embodiment of the present invention. As shown in FIG. 15A, the moving object detection apparatus according to the present modification example includes a motion estimation unit 150 in addition to the components included by the moving object detection apparatus shown in FIG. 1. It is to be noted that, in FIG. 15A, the same numerals are assigned to the same components as in FIG. 1 and the description is omitted.

Figure 15B:
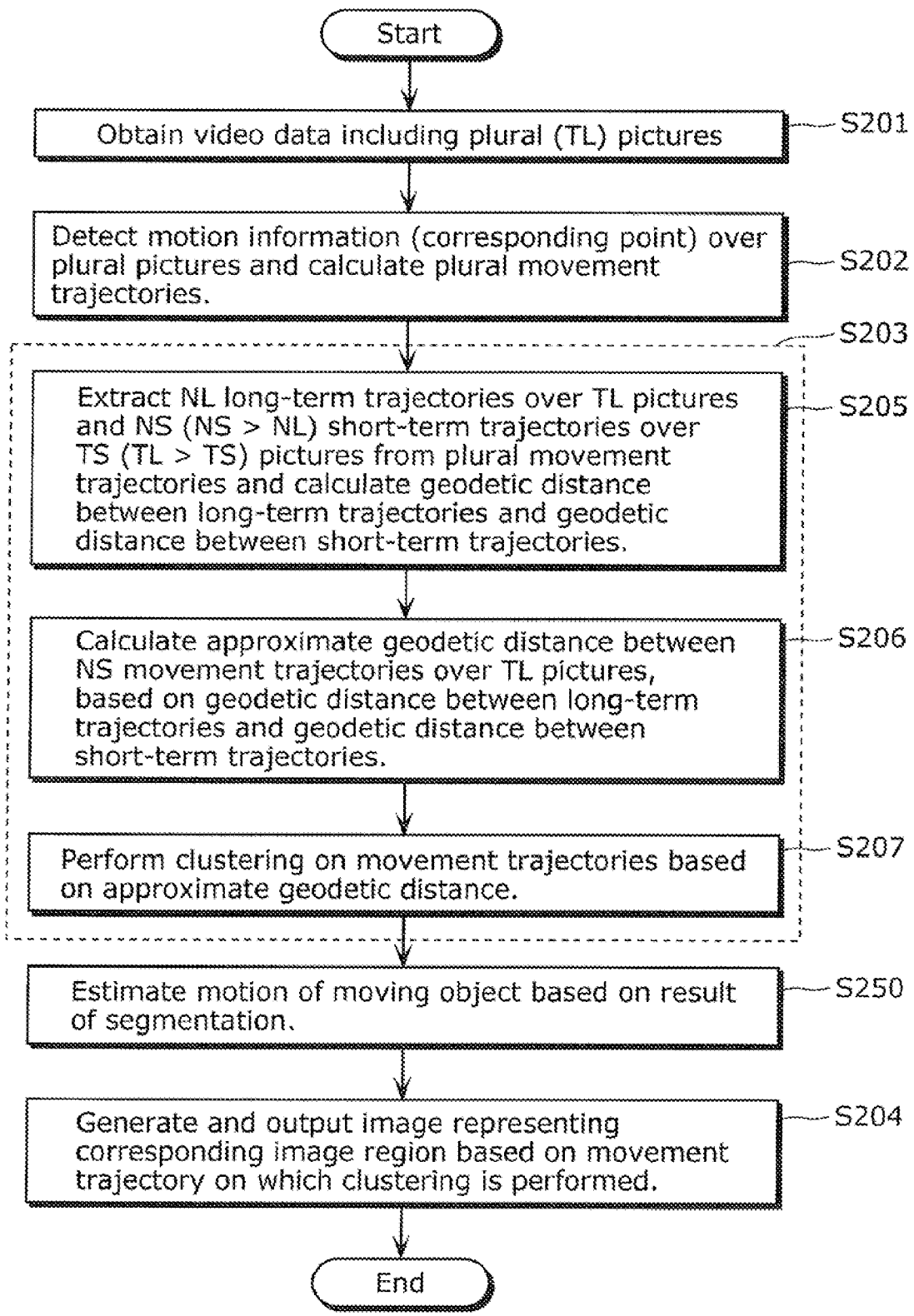
FIG. 15B is a flowchart which shows an operation of a moving object detection apparatus according to the modification example of the embodiment of the present invention.

FIG. 15B is a flowchart which shows an operation of the moving object detection apparatus according to a modification example of the embodiment of the present invention. In FIG. 15B, the same numerals are assigned to the same processes as in FIG. 3 and the description is arbitrarily omitted. It is to be noted that, In FIG. 15B, Step S250 corresponds to the motion estimation unit 150 in FIG. 15A. More specifically, the motion estimation unit 150 performs the processes of motion estimation step S250.

The motion estimation unit 150 calculates a representative trajectory from movement trajectories of pixels included in each of the regions based on the result of segmentation obtained by the segmentation unit 107 and estimates a motion of the moving object using the representative trajectory (Step S250).

More specifically, when the movement trajectory of a pixel that belongs to a region $\theta_m$ is denoted as $x^{cm}$, the motion estimation unit 150 first calculates a representative movement trajectory per a cluster region $\theta_m$ as shown in Expression 26 below.

$$\overline{x^m}$$

It is to be noted that the motion estimation unit 150 calculates an average movement trajectory as the representative movement trajectory using Expression 26, however, the motion estimation unit 150 may calculate by weighting per movement trajectory $x^{cm}$ for the calculation or may calculate, as the representative movement trajectory, a movement trajectory of a pixel corresponding to a cluster center on an image.

$$\overline{x^m} = \frac{1}{C_m} \sum_{c=1}^{C_m} x^{cm} \qquad \text{Expression 26}$$

Here, $C_m$ is the number of pixels that belong to the region $\theta_m$ or the number of movement trajectories of a pixel.

Figure 16:
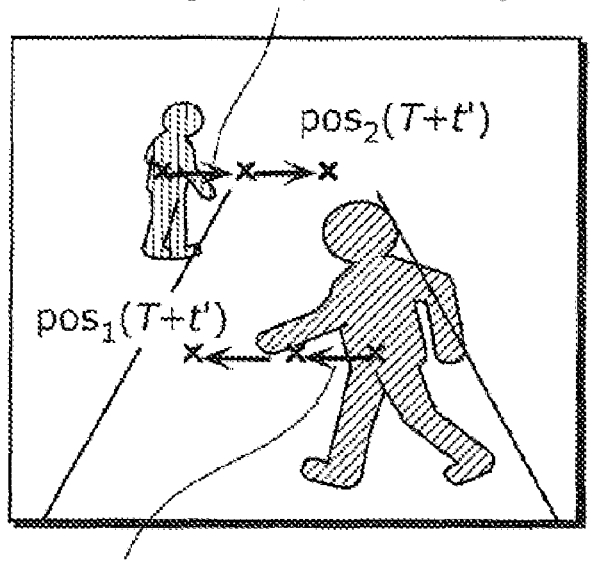
FIG. 16 is a diagram for explaining a motion estimation of the moving object detection apparatus according to the modification example of the embodiment of the present invention.

FIG. 16 is a diagram for explaining a motion estimation of the moving object detection apparatus according to the present modification example. More specifically, FIG. 16 is a diagram which shows an example of obtaining a representative movement trajectory per cluster region $\theta_m$ based on Expression 26. In the diagram, the signs "x" indicate positions of pixels of representative movement trajectories each corresponding to time t.

$$\overline{x^m}$$

According to such a calculation method, since the segmentation through the clustering on the nonlinear space is performed in consideration of the similarity in pixel motion as described above, the motion estimation unit 150 can calculate a representative movement trajectory using only movement trajectories of pixels having similarity in motion compared to a method of simply calculating a temporal average of adjacent movement trajectories, and thus it is possible to calculate the representative trajectory with higher accuracy. As described above, the motion estimation unit 150 calculates a representative movement trajectory per cluster region, thereby expressing motion per region accurately and easily.

Next, the motion estimation unit 150 estimates a position of the moving object in time prior to the time T, using the calculated representative movement trajectory. To do so, the motion estimation unit 150 calculates acceleration from the representative movement trajectory and estimates a position of the moving object T+1 and subsequent to T+1. When three or more time-series images are inputted, the motion estimation unit 150 calculates an acceleration vector $s^m$ for each of the representative movement trajectories as shown in the following expression 27.

$$\overline{s_{t+1}^m} = \{u_{t+1}^{m1} - u_t^m\} - \{u_t^m - u_{t-1}^n\} \quad \text{Expression 27}$$

Here, $u_t^m$ is a motion vector and can be expressed as the following Expression.

$$u_i^m = (u_t^m, v_t^m) \quad \text{Expression 28}$$

The motion estimation unit 150 estimates, using the acceleration vector $s^m$ shown in Expression 27, a position $pos_m(T+t')$ of the moving object at time $T+t'$ for each of the moving objects as denoted in FIG. 16 as "x", as shown in the following Expression 29.

$$pos_m(T+t') = pos_m(T) + t'u_T^m + \frac{1}{2}t'^2 s_T^m \quad \text{Expression 29}$$

Finally, the output unit 104 outputs the position of the moving object that has been estimated by the motion estimation unit 150 as described above. This allows the motion estimation unit 150 to perform motion estimation while taking account of acceleration. When the motion of a moving object rapidly increases in speed or suddenly stops, the motion estimation unit 150 can estimate the position of the moving object while reflecting the acceleration. It is to be noted that the motion estimation unit 150 may perform motion estimation using an affine parameter instead of the motion vector. The affine parameter allows representing motions including rotational movement and can estimate the position of an object with higher accuracy.

Figure 17:
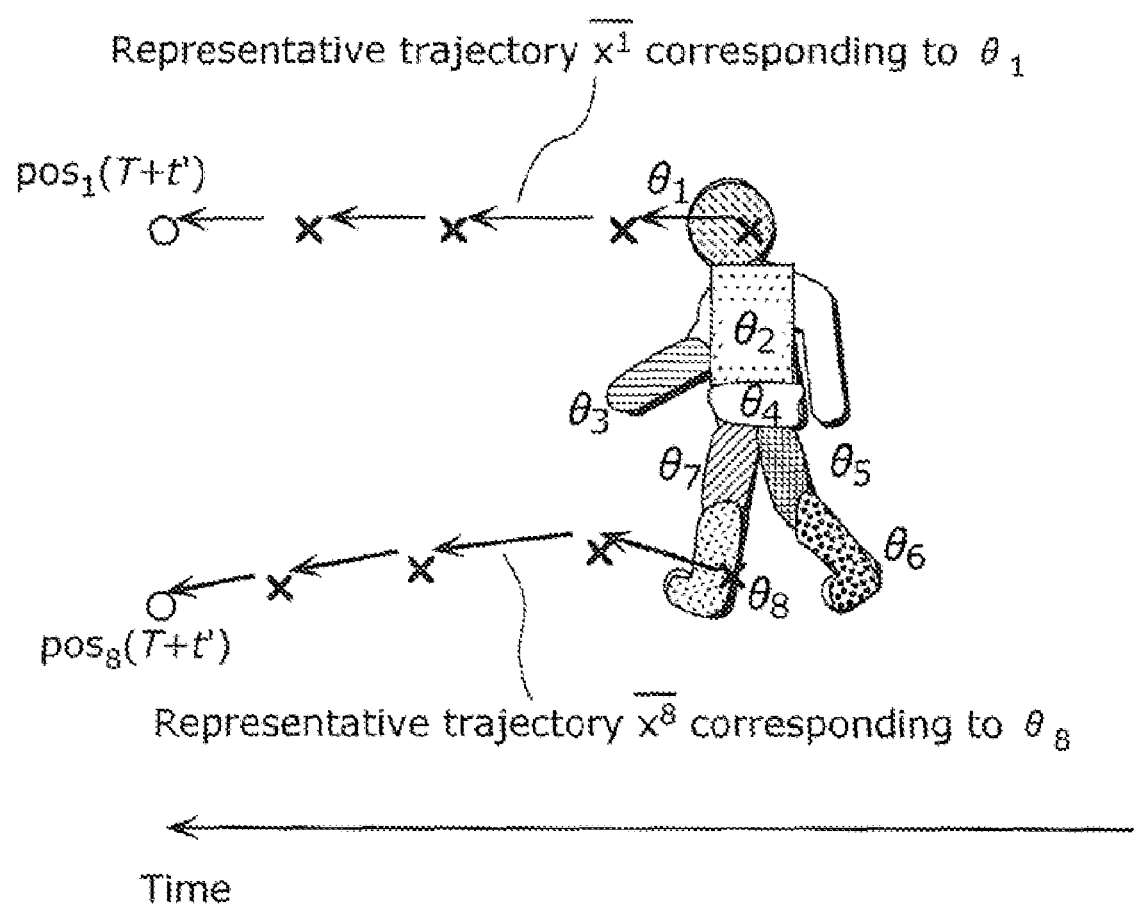
FIG. 17 is a diagram which shows an example of a result of a movement estimation.

FIG. 17 is a diagram which shows an example of a result of performing movement estimation on another video. More specifically, FIG. 17 is a diagram which shows an example of obtaining a representative movement trajectory per cluster region $\theta^m$ based on Expression 26, when the number of clusters is 9 in video including a single person. However, in consideration of viewability, representative movement trajectories for only the cluster region $\theta_1$ corresponding to a head-region and the cluster region $\theta_8$ corresponding to a leg-region are shown in FIG. 17. In addition, the background is not illustrated. In the diagram, the signs "x" are elements of representative movement trajectories each corresponding to time t and indicate positions of pixels.

$\overline{x^m}$

As described above, with the moving object detection apparatus and method according to the present embodiment and modifications, it is possible to detect a moving object or a part of the moving object in an image and segment the image including the moving object irrespective of a posture of the articulated object, as a result of temporally tracking a region of the object moving in the image, by performing clustering based on a distance between pixels or similarity between the movement trajectories. Furthermore, since it is not necessary to set a human candidate region as preprocessing, no failure occurs in segmentation due to an error in detecting the human candidate region. As described above, by performing clustering in a nonlinear space without requiring fitting of a vast quantity of parameters, it is possible to accurately perform segmentation on an image including a human object or the like that moves changing shape, thereby enabling detection of the moving object in the image.

In addition, the moving object detection apparatus 100 according to the embodiment described above includes the image input unit 101 and the motion analysis unit 102, however, those components are not indispensable in the present invention. More specifically, in the case where the movement trajectories of an image in each of the blocks included in video are calculated in advance, the moving object detection apparatus 100 may obtain such movement trajectories from outside and may perform processing of steps S203 to 207 in FIG. 3 on the obtained movement trajectories.

Furthermore, although the present invention is implemented as an moving object detection apparatus, it is obvious that the present invention can be implemented as an image processing apparatus which extracts or segments the region of an object having motion in video as long as the function of the segmentation unit 107 is included. Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable as a moving object detection apparatus which detects a moving object in an image by performing region extraction on the image including the moving object such as a person that moves changing shape, based on motions included in plural pictures, and is applicable, for example, as a moving object detection apparatus or the like to be incorporated in audio-video equipment such as a motion analyzer, a monitoring apparatus, a video camera, or a TV set.

What is claimed is:

1. A moving object detection method for detecting a moving object in video by performing segmentation on all or part of the moving object in the video, said moving object detection method comprising:

extracting NL long-term trajectories (NL≧2) and NS short-term trajectories (NS>NL) using movement trajectories each of which includes corresponding points over two or more pictures included in the video, the long-term trajectories being movement trajectories over TL pictures (TL≧3), the short-term trajectories being movement trajectories over TS pictures (TL>TS≧2) included in the TL pictures; calculating a geodetic distance between the NL long-term trajectories and a geodetic distance between the NS short-term trajectories;

calculating an approximate geodetic distance that is a geodetic distance between NS movement trajectories over the TL pictures, based on the geodetic distance between the long-term trajectories and the geodetic distance between the short-term trajectories calculated in said calculating of a geodetic distance; and performing segmentation by segmenting a group of the movement trajectories as a single region, based on the approximate geodetic distance calculated in said calculating of an approximate geodetic distance.

2. The moving object detection method according to claim 1, wherein in said calculating of an approximate geodetic distance, a partial short-term trajectory is extracted based on the geodetic distance between the short-term trajectories, and the approximate geodetic distance is calculated based on the extracted partial short-term trajectory, the partial short-term trajectory being a group of the short-term trajectories.

3. The moving object detection method according to claim 1,
wherein in said calculating of an approximate geodetic distance, the approximate geodetic distance is calculated by performing linear interpolation on the geodetic distance between the long-term trajectories based on the geodetic distance between the short-term trajectories.

4. The moving object detection method according to claim 3,
wherein in said calculating of an approximate geodetic distance, the approximate geodetic distance is calculated by performing weighted linear interpolation so that a weight becomes larger as the geodetic distance between the short-term trajectories is smaller.

5. The moving object detection method according to claim 1,
wherein in said calculating of a geodetic distance,
(i) a linear distance between the movement trajectories is calculated, (ii) a non-linearized distance is calculated by transforming, into an infinite value, a part of the linear distance between the movement trajectories, and (iii) a shortest distance among a plurality of distances of paths is calculated as the geodetic distance, the paths extending from one of two movement trajectories to the other of the two movement trajectories and passing through another movement trajectory as a relay point.

6. The moving object detection method according to claim 1,
further comprising:
capturing pictures included in the video; and
performing detection, on the pictures, of corresponding points between two pictures to calculate movement trajectories each including corresponding points over two or more pictures,
wherein in said extracting, the long-term trajectories and the short-term trajectories are extracted using the movement trajectories calculated in said performing detection.

7. The moving object detection method according to claim 6,
further comprising performing image processing on the video captured in said capturing pictures so that the video is displayed in a different mode for each of the regions segmented in said performing segmentation, and outputting the video after the image processing.

8. The moving object detection method according to claim 7,
wherein in said performing image processing, NS approximate long-term trajectories are calculated, based on the approximate geodetic distance calculated in said calculating of an approximate geodetic distance and the NL long-term trajectories and the NS short-term trajectories extracted in said extracting, and video including the calculated approximate long-term trajectories is output, the NS approximate long-term trajectories being interpolated with a virtual long-term trajectory.

9. The moving object detection method according to claim 1,
further comprising estimating motion of the moving object by: calculating a representative movement trajectory that represents the region, using movement trajectories included in the region segmented in said performing segmentation; and estimating that the region moves according to the calculated representative movement trajectory.

10. The moving object detection method according to claim 1,
wherein in said extracting, the long-term trajectories are extracted by changing the TL according to the number of extracted long-term trajectories.

11. The moving object detection method according to claim 10,
wherein in said extracting, the long-term trajectories are extracted by increasing the TL when the number of extracted long-term trajectories exceeds a predetermined first upper limit.

12. The moving object detection method according to claim 10,
wherein in said extracting, the long-term trajectories are extracted by decreasing the TL when the number of extracted long-term trajectories falls below a predetermined first lower limit.

13. The moving object detection method according to claim 1,
wherein in said extracting, the short-term trajectories are extracted by changing the TS according to the number of extracted short-term trajectories.

14. The moving object detection method according to claim 13,
wherein in said extracting, the short-term trajectories are extracted by increasing the TS when the number of extracted short-term trajectories exceeds a predetermined second upper limit.

15. The moving object detection method according to claim 13,
wherein in said extracting, the short-term trajectories are extracted by decreasing the TS when the number of extracted short-term trajectories falls below a predetermined second lower limit.

16. A moving object detection apparatus which detects a moving object in video by performing segmentation on all or part of the moving object in the video, said moving object detection apparatus comprising:
a distance calculating unit configured to extract NL long-term trajectories (NL≧2) and NS short-term trajectories (NS>NL) using movement trajectories each of which includes corresponding points over two or more pictures included in the video, and to calculate a geodetic distance between the NL long-term trajectories and a geodetic distance between the NS short-term trajectories, the long-term trajectories being movement trajectories over TL pictures (TL≧3), the short-term trajectories being movement trajectories over TS pictures (TL>TS≧2) included in the TL pictures;
a distance interpolation unit configured to calculate an approximate geodetic distance that is a geodetic distance between NS movement trajectories over TL pictures based on the geodetic distance between the long-term trajectories and the geodetic distance between short-term trajectories calculated by said distance calculating unit; and
a segmentation unit configured to perform segmentation by segmenting a group of the movement trajectories as a single region based on the approximate geodetic distance calculated by said distance interpolation unit.

17. A program recorded on a non-transitory computer-readable recording medium, for detecting a moving object in video by segmenting all or part of the moving object in the video, which, when loaded into a computer, allows the computer to execute each step included in the moving object detection method according to claim 1.

* * * * *